US007061942B2

(12) United States Patent
Noronha, Jr. et al.

(10) Patent No.: US 7,061,942 B2
(45) Date of Patent: Jun. 13, 2006

(54) APPARATUS FOR REDUNDANT MULTIPLEXING AND REMULTIPLEXING OF PROGRAM STREAMS AND BEST EFFORT DATA

(75) Inventors: Ciro Aloisio Noronha, Jr., Palo Alto, CA (US); Baijnath Agarwal, Santa Clara, CA (US); Bradley Therin Darnell, Los Altos, CA (US)

(73) Assignee: SkyStream Networks Inc., Sunnyvale, CA (US)

( * ) Notice: Subject to any disclaimer, the term of this patent is extended or adjusted under 35 U.S.C. 154(b) by 146 days.

(21) Appl. No.: 10/159,787

(22) Filed: May 31, 2002

(65) Prior Publication Data

US 2003/0223466 A1 Dec. 4, 2003

(51) Int. Cl.
*H04J 3/02* (2006.01)
*H04J 1/16* (2006.01)

(52) U.S. Cl. .................................... 370/537; 370/219

(58) Field of Classification Search ................ 370/242, 370/230, 230.1, 235, 236, 389, 390, 392, 370/395.4, 428, 437, 537, 228, 419, 463, 370/486, 542, 216, 225, 217–220
See application file for complete search history.

(56) References Cited

U.S. PATENT DOCUMENTS 5,390,174 A * 2/1995 Jugel .......................... 370/392
5,835,493 A * 11/1998 Magee et al. .......... 370/395.62
6,002,687 A * 12/1999 Magee et al. ............... 370/394
6,516,352 B1 * 2/2003 Booth et al. ................ 709/250
6,526,057 B1 * 2/2003 Lee ....................... 370/395.42
6,556,594 B1 * 4/2003 Uchide ....................... 370/537
6,813,241 B1 * 11/2004 Wang et al. ................ 370/228
6,826,197 B1 * 11/2004 Goode et al. ............... 370/466
2002/0024928 A1 * 2/2002 Furuichi ..................... 370/218
2002/0152346 A1 * 10/2002 Stone et al. ................ 710/305
2003/0112746 A1 * 6/2003 Schaller et al. ............. 370/216

OTHER PUBLICATIONS

Newton, Newton's Telecom Dictionary, Oct. 1998, Telecom Books, p. 141.*

* cited by examiner

*Primary Examiner*—Chi Pham
*Assistant Examiner*—Ronald Abelson
(74) *Attorney, Agent, or Firm*—Proskauer Rose LLP

(57) ABSTRACT

A redundant remultiplexer includes two media control modules, wherein, if the primary module operates in an input mode, the backup module performs the same processing of packets as the primary module but only transmits processed packets to a switch if the primary module fails, and wherein, if the primary module is operating in an output mode, the backup module performs the same processing as the primary output module on the same sequence of packets received from the switch, but the backup module only outputs the processed packets if the primary module fails.

24 Claims, 8 Drawing Sheets

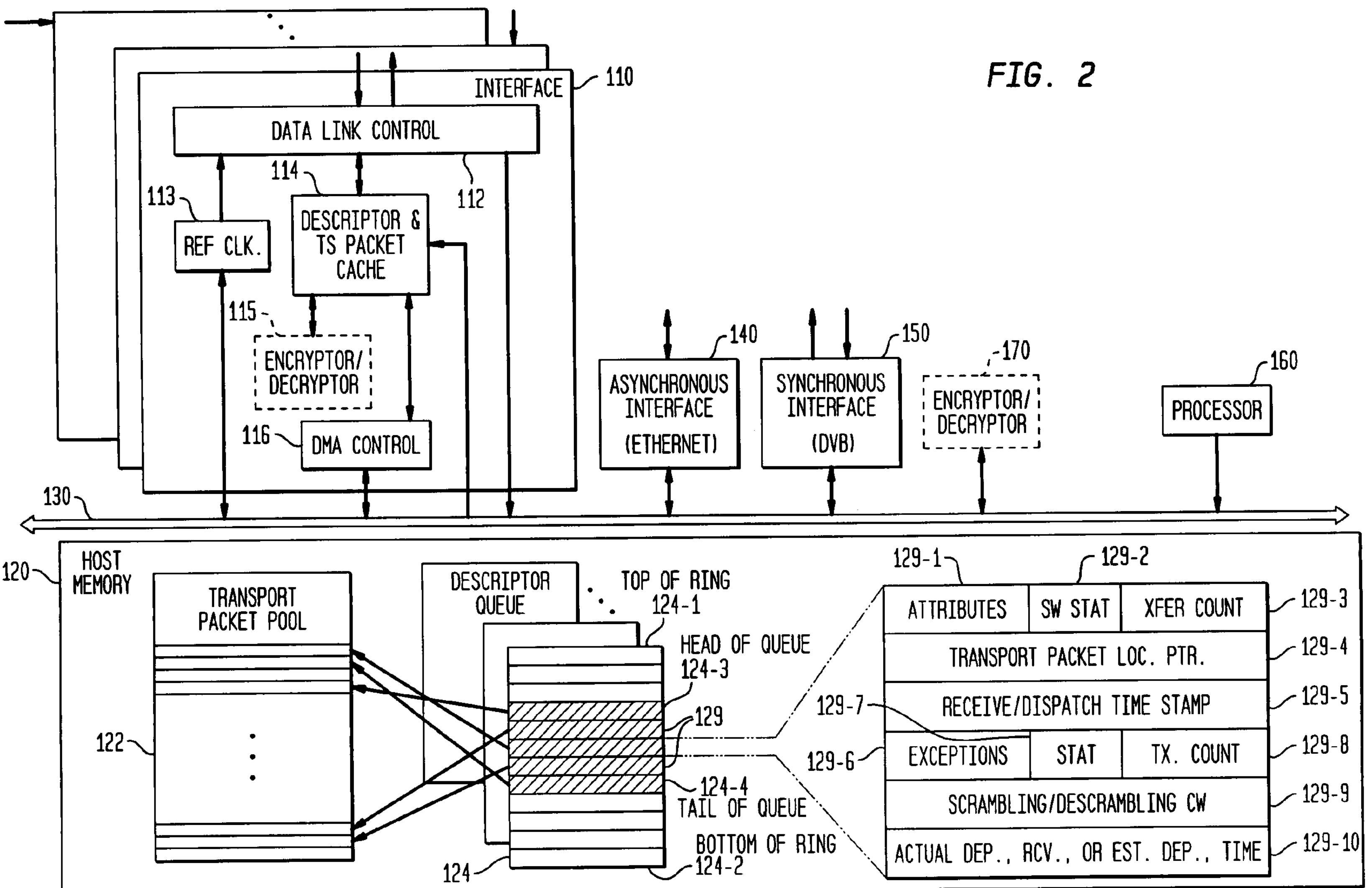
FIG. 2
INTERFACE
110
DATA LINK CONTROL
112
113
REF CLK.
114
DESCRIPTOR & TS PACKET CACHE
115
ENCRYPTOR/ DECRYPTOR
116
DMA CONTROL
140
ASYNCHRONOUS INTERFACE (ETHERNET)
150
SYNCHRONOUS INTERFACE (DVB)
170
ENCRYPTOR/ DECRYPTOR
160
PROCESSOR
130
120
HOST MEMORY
TRANSPORT PACKET POOL
122
DESCRIPTOR QUEUE
TOP OF RING
124-1
HEAD OF QUEUE
124-3
129
124-4
TAIL OF QUEUE
BOTTOM OF RING
124-2
124
129-1
129-2
ATTRIBUTES
SW STAT
XFER COUNT
129-3
TRANSPORT PACKET LOC. PTR.
129-4
129-7
RECEIVE/DISPATCH TIME STAMP
129-5
129-6
EXCEPTIONS
STAT
TX. COUNT
129-8
SCRAMBLING/DESCRAMBLING CW
129-9
ACTUAL DEP., RCV., OR EST. DEP., TIME
129-10

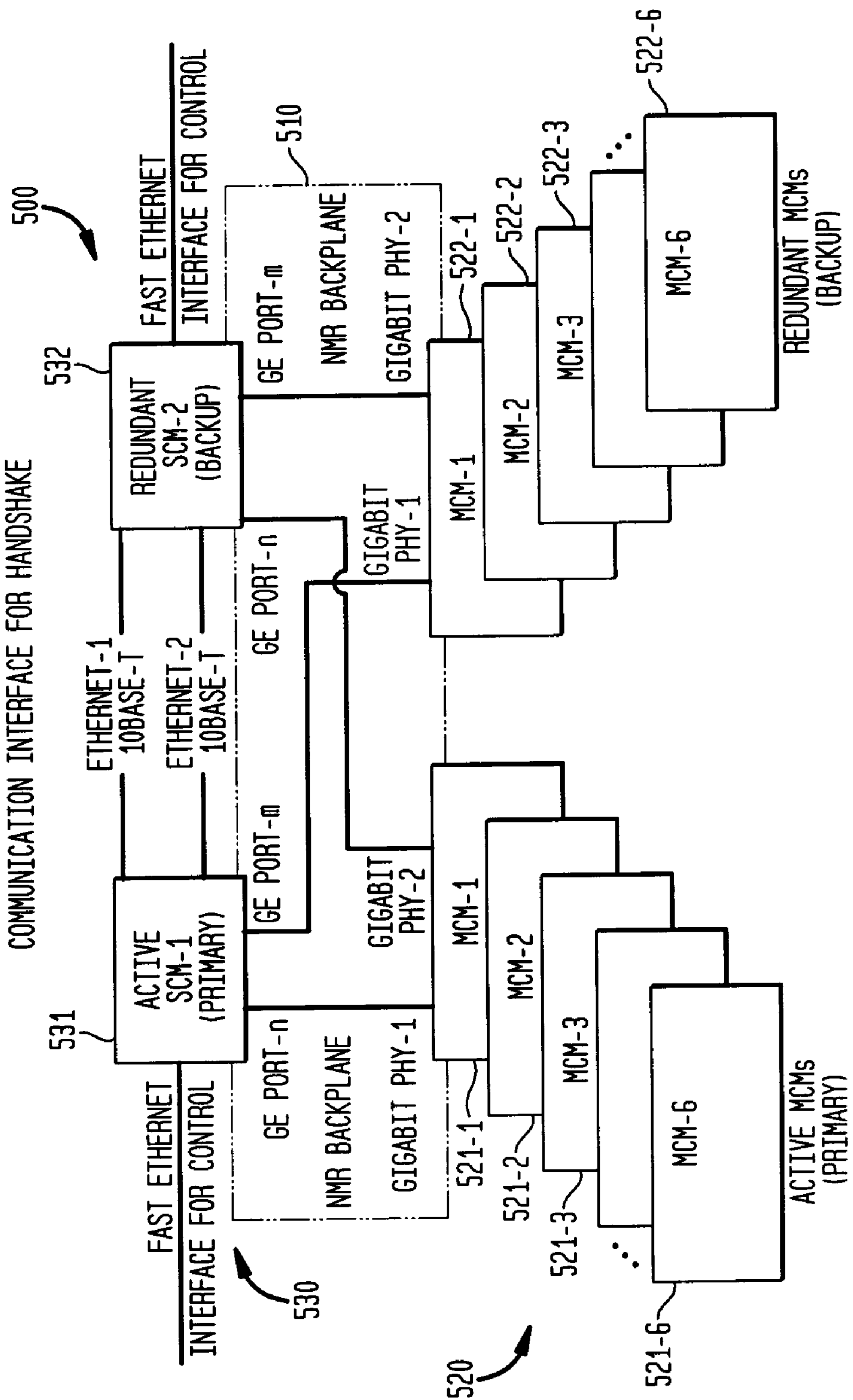
FIG. 7
COMMUNICATION INTERFACE FOR HANDSHAKE
500
530
520
510
531
532
ACTIVE SCM-1 (PRIMARY)
REDUNDANT SCM-2 (BACKUP)
FAST ETHERNET INTERFACE FOR CONTROL
FAST ETHERNET INTERFACE FOR CONTROL
ETHERNET-1 10BASE-T
ETHERNET-2 10BASE-T
GE PORT-n
GE PORT-m
GE PORT-m
GE PORT-n
NMR BACKPLANE
NMR BACKPLANE
GIGABIT PHY-1
GIGABIT PHY-2
GIGABIT PHY-2
GIGABIT PHY-1
GIGABIT PHY-2
GIGABIT PHY-1
MCM-1
MCM-2
MCM-3
MCM-6
MCM-1
MCM-2
MCM-3
MCM-6
521-1
521-2
521-3
521-6
522-1
522-2
522-3
522-6
ACTIVE MCMs (PRIMARY)
REDUNDANT MCMs (BACKUP)

APPARATUS FOR REDUNDANT MULTIPLEXING AND REMULTIPLEXING OF PROGRAM STREAMS AND BEST EFFORT DATA

RELATED APPLICATIONS

The subject matter of this application is related to the subject matter of the following patent applications, all of which are commonly assigned to the same assignee as is this application:

(1) U.S. patent application Ser. No. 09/007,212, entitled "Receipt and Dispatch Timing of Transport Packets in a Video Program Bearing Stream Remultiplexer," filed on Jan. 14, 1998 for Regis Gratacap and William Slattery, and issued as U.S. Pat. No. 6,292,490;

(2) U.S. patent application Ser. No. 09/007,334, entitled "Dynamic Video Program Bearing Stream Remultiplexer," filed on Jan. 14, 1998 for Regis Gratacap, now abandoned;

(3) U.S. patent application Ser. No. 09/007,203, entitled "Re-timing of Video Program Bearing Streams Transmitted by an Asynchronous Communication Link," filed on Jan. 14, 1998 for Regis Gratacap, now issued as U.S. Pat. No. 6,195,368;

(4) U.S. patent application Ser. No. 09/007,211, entitled "Bandwidth Optimization of Video Program Bearing Streams," filed on Jan. 14, 1998 for Robert Robinett and Regis Gratacap, now issued as U.S. Pat. No. 6,351,471;

(5) U.S. patent application Ser. No. 09/007,210, entitled "Network Distributed Remultiplexer for Video Program Bearing Streams," filed on Jan. 14, 1998 for Robert Robinett, Regis Gratacap and William Slattery, now issued as U.S. Pat. No. 6,351,474;

(6) U.S. patent application Ser. No. 09/007,204, entitled "Remultiplexer for Video Program Bearing Transport Streams with Assisted Output Timing for Asynchronous Communication Output," filed on Jan. 14, 1998 for Regis Gratacap;

(7) U.S. patent application Ser. No. 09/006,964, entitled "Remultiplexer for Video Program Bearing Transport Streams with Program Clock Reference Time Stamp Adjustment," filed on Jan. 14, 1998 for William Slattery and Regis Gratacap, now issued as U.S. Pat. No. 6,111,896;

(8) U.S. patent application Ser. No. 09/007,198, entitled "Remultiplexer Cache Architecture and Memory Organization for Storing Video Program Bearing Transport Packets and Descriptors," filed on Jan. 14, 1998 for William Slattery and Regis Gratacap, now issued as U.S. Pat. No. 6,064,676;

(9) U.S. patent application Ser. No. 09/007,199, entitled "Scrambling and Descrambling Control Word Control in a Remultiplexer for Video Bearing Transport Streams," filed on Jan. 14, 1998 for William Slattery and Regis Gratacap, now issued as U.S. Pat. No. 6,148,082;

(10) U.S. patent application Ser. No. 09/006,963, entitled "Reference Time Clock Locking in a Remultiplexer for Video Program Bearing Transport Streams," filed on Jan. 14, 1998 for William Slattery, now issued as U.S. Pat. No. 6,246,701; and

(11) U.S. patent application Ser. No. 09/393,227, entitled "Remultiplexer Architecture for Controlling the Supply of Data to be Combined With Constant End-to-End Delay Information," filed on Sep. 9, 1999 for John R. Mick, Jr.

FIELD OF THE INVENTION

The present invention pertains to equipment that can transmit encoded audio-video program signals, or other digital signals with strict delivery timing constraints, which continue operation in the event of component failure.

BACKGROUND OF THE INVENTION

The above-listed incorporated patents and patent applications describe a system capable of remultiplexing program bearing digital signals. Illustratively, these signals are formatted as MPEG-2 transport streams according to the MPEG-2 Standard described in ISO 13818-1. Such transport streams may contain "program" signals, i.e., signals which must be delivered under strict timing considerations to prevent buffer underflow and overflow, most notably, at the ultimate receiver/decoder of the signal. Such signals may contain information (e.g., a video signal, an audio signal, a closed captioning or tele-text signal, a composition signal, a graphical overlay/subpicture signal, etc.) to be presented (e.g., displayed or made audible), or which is valid, at specific times (e.g., video frame intervals or audio frame intervals) which is variably encoded (compressed and formatted). Variable encoding produces different or varying amounts of information for each of multiple segments of a fixed amount of uncompressed information. For example, according to H.261, MPEG, MPEG-2, MPEG-4, H.263x, H.264, etc. the amount of compressed information needed to represent each encoded frame (picture, field, video object plane or other picture portion to be presented in a given interval of time) unpredictably varies from frame to frame. Such variably encoded signals can be transferred at a constant rate or a varying rate within the transport stream. The program signal is formed (encoded and formed into a transport stream signal) so that a receiver/decoder of known buffer size and information removal behavior (e.g., dictated in ISO 11172-1, 2 and 3, 13818-1, 2 and 3, 14496-1, 2 and 3, etc.) will neither overflow nor underflow. Time stamps, such as program clock references ("PCRs") (or system clock references ("SCRs")), presentation time stamps ("PTSs") and decoding time stamps ("DTSs") are inserted into the program bearing signal by the encoder which formed it, to enable a receiver/decoder to recover a clock signal of the encoder which produced the program signal and to remove various portions of the information for decoding and presentation according to a predictable schedule. To ensure that the receiver/decoder can always decode the program signal (barring an unexceptional circumstance, such as errors in the signal), all devices in the delivery path between the transmitter/encoder of the program signal and receiver/decoder must introduce a constant delay (i.e., the same delay) to each encoded portion of the program signal. In the case that some relative change in delay is introduced to one encoded portion of the program signal relative to the other portions, the device introducing such delay must modify the time stamps in the program signal to account for such delay as necessary. Alternatively, under extraordinary circumstances, the program signal may be re-encoded or its delivery rate adjusted to ensure that the timing information embedded in the program signal causes predictable and "ordinary" information "flow" through the receiver's buffers, decoder and presentation/execution devices (i.e., sufficient and controlled delivery of information through each stage of the receiver to enable the originally intended decodability of the program signal).

The above-listed incorporated references can also optimize a transport stream by increasing the amount of information the transport stream is carrying. Specifically, an input transport stream produced by a program encoder, or subsequently remultiplexed by a conventional remultiplexer, typically has some "null" transport packets. Null transport packets are a type of stuffing signal formed as transport packets with headers but no useful data in their payload. (A receiver/decoder of a transport stream simply discards or ignores null transport packets as they are received.) The purpose of null transport packets is to maintain adequate spacing between other transport packets carrying useful or decodable information in case that the instantaneous amount of information produced by an encoder is not sufficient to fill the entire bandwidth of the transport stream allocated for the signal produced by the encoder. Alternatively, in some signals, transport packets carrying useful data can be separated by durations in time not containing any transport packets, e.g., empty timeslots. The inventive system can optimize such a transport stream by inserting additional useful information bearing transport packets in lieu of null transport packets or into such empty timeslots. As can be appreciated, no useful data is lost in such an operation. Typically, the data to be inserted is "best-effort" data or some other type data not requiring a strict delivery schedule.

Another advantage of this system is the ability to distribute the remultiplexing operation into multiple standalone components that can communicate with one another.

A network for transferring compressed program signals, which has some redundant elements, is known in the prior art. See U.S. Pat. No. 5,835,493. In this system, plural uncompressed audio-video signals are received at plural program encoders and a "multiplexer". The multiplexer is a type of switch that receives plural uncompressed audio-video signals at its inputs and connects one of them to its output. This type of multiplexer/switch can only switch a whole signal, i.e., it does not selectively switch on a packet or frame basis. The outputted transport streams of all of these encoders are inputted to a primary remultiplexer and a backup remultiplexer. The outputs of the two remultiplexers are inputted to a second "multiplexer," which, again, is nothing more than a simple signal switch. In response to the active one of the remultiplexers detecting a program encoder failure, the active remultiplexer can cause the first multiplexer/switch to connect the uncompressed video signals of the failed program encoder to the backup program encoder. Likewise, the program encoders, or other monitoring device, can detect a failure of the primary remultiplexer and cause the second multiplexer/switch to select the transport stream outputted from the backup remultiplexer instead of the transport stream outputted from the primary remultiplexer. This system has the following drawbacks:

(1) This system has multiple inputs for receiving multiple uncompressed program signals, but only a single output from which the program signals may be transmitted. In a sense, this network merely selectively aggregates the input program signals into a single output.

(2) This system lacks a router or switch element that is capable of performing any "layer 3" or network layer routing/forwarding of the program signals to specific outputs. Nor does this system perform any "layer 2" or data link layer switching. In other words, there is no element that selectively outputs one packet to a first output and a second packet to a second output based on information contained in the packets, such as address or identifier information. The system can only choose which packets are to be outputted at all; all packets chosen for output emerge from the same output port as part of the single aggregate remultiplexed signal.

Also, in the unrelated art of telephony, apparatuses are known for switching entire input signals to specific outputs. Some of these devices have redundant elements for replacing failed elements. Generally, switching in such redundant systems is performed at "layer 1". Such redundant systems do not perform any layer 2 or layer 3 switching, i.e., switching of specific segments of a given signal to one of multiple outputs based on address information contained with each such segment. Such apparatuses are not known to have buffering of the inputted signals and furthermore, do not require complicated internal processing of a stream of inputted packets as a preliminary step to ensuring that all packets are outputted according to a strict timing schedule.

The object of the present application is to provide an improved remultiplexer system with redundant operation in the event of failure of one or more of the standalone components of the remultiplexer system.

SUMMARY OF THE INVENTION

This and other objects are achieved according to the present invention. According to one embodiment, a redundant remultiplexer is provided with at least two media control modules ("MCMs") and a pair of switch control modules ("SCMs"). Each media control module has multiple ports, a clock, at least one processor, and a network interface. The ports are configurable as inputs or outputs. Input ports are capable of receiving an externally originating sequence of one or more packets, and output ports are capable of transmitting externally a sequence of one or more packets. The clock is capable of generating a time value that can be used to determine a time at which each externally originating packet is received at the ports, or an approximate time for transmitting externally each packet from the ports. The processors are capable of processing each packet according to the respective time determined for the packet by the clock, to schedule selected ones of the packets for transmission. The network interface is capable of transmitting packets processed by the processor to, or receiving packets to be processed by the processor from, another device. The switch control module is capable of communicating packets with the media control modules via the network interfaces of the media control modules. The switch control module is also capable of selecting, based on address information carried within each packet present at the switch control module, a specific media control module to receive each of the packets present at the switch control module. One of the media control modules operates as a primary module for receiving an externally originating sequence of packets, and for outputting externally a sequence of packets. The other media control module operates as a backup module for the primary module. For the output ports in the backup module, the processor of the backup module performs the same processing of packets as the primary module but the interface of the backup module only transmits processed packets to the switch control module if the primary module fails. If the primary module is operating in the output mode, the processor of the backup module performs the same processing as the primary output module on the same sequence of packets received from the switch module, but the port of the backup module only externally outputs the signal if the primary module fails.

The redundant remultiplexer contains a pair of Switch Control Modules for control plane redundancy. Each Media Control Module has one physical connection to each of the Switch Control Modules, and simultaneously sends packets to both of them. Both Switch Control Modules process these packets in the same way. Each Media Control Module receives packets from both Switch Control Modules, and selects the packets from the primary Switch Control Module for processing; the packets from the backup Switch Control Module are discarded.

Illustratively, the switch control module is capable of transmitting each of one or more of the to-be-externally outputted packets to each of one or more of the media control modules with a multicast destination address of a specific multicast group to which the one or more media control modules subscribe. In such a case, if primary module operates in the input mode, the backup module is capable of subscribing to the same multicast group as the primary module so that both the primary module and the backup module receive and process the multicast packets transmitted by the switch control module.

Illustratively, the switch control module is capable of transmitting at least one IP packet to the primary module using a MAC address assigned to at least the primary module. In such a case, the backup module illustratively is capable of receiving and processing an identical copy of the at least one of the IP packets transmitted to the primary module with that MAC address. In another embodiment, both the backup module and primary module are both capable of being assigned of the same common IP. Illustratively, each of the primary module and backup module is capable of receiving, for external output from its port within the sequence of packets, externally originating data received via a TCP connection from an external source. In such a case, the backup module illustratively is capable of filtering out certain control packets received at its interface (such as ARP packets meant for the same common address, TCP packets destined to the same common address, or both) prior to processing by the IP protocol stack, if no failure of the primary module is detected.

Illustratively, the redundant remultiplexer has a similar backup switch module capable of performing the same tasks. In such a case, the media control modules illustratively discard packets transmitted from the backup switch module unless the primary switch module is determined to have failed.

Illustratively the interface of each media control module comprises a media access control circuit, a physical layer circuit and a switch circuit. The physical layer circuitry has a first input capable of receiving packets from a first device, such as the primary switch module and a first output for outputting the packets destined to the device connected to the first input. The physical layer circuit also has a second input capable of receiving packets from a backup device for the first device, such as a backup switch module and a second output for outputting packets destined to the device connected to the second input. The switch circuit has first and second selectable inputs connected to the first and second outputs of the physical layer circuitry, respectively. The switch circuit also has an output connected to the receive input of the media access control circuit. This interconnection provides the media access control circuit the capability of selectively receiving the to-be-externally transmitted packets from only one of the first device (e.g., the primary switch module) or the backup for the first device (e.g., the backup switch module) at one time. Illustratively, the switch circuit selects the packets from the backup device (e.g., the backup switch module) only in response to detecting a failure of the first device (e.g., the primary switch module).

Illustratively each of the primary switch module and the backup switch module has at least one external interface for receiving packets other than those provided by the media control modules. The external interface is capable of receiving one or more addressed packets. Each of the primary and backup switch modules is capable of receiving identical copies of the addressed packets and being capable of selecting, based on address information carried within the corresponding packet, a specific media control module to receive each of selected ones of the addressed packets. In such a case, the same IP address is assigned to the external interfaces of both of the primary switch module and the backup switch module. However, the backup switch module is capable of disabling its external interface in the absence of a determination that the primary switch module has failed.

The Switch Control Modules have at least two private channels in which to communicate with each other. These private channels are used to keep their configuration information synchronized. At least two channels are required to improve the reliability of the design; if one channel fails, there is at least one alternative. The Switch Control Modules continually monitor these private channels to ensure their continued operation.

BRIEF DESCRIPTION OF THE DRAWINGS

The following detailed description, given by way of example and not intended to limit the present invention solely thereto, will best be understood in conjunction with the accompanying drawings, where similar elements will be represented by the same reference symbol.

FIG. 2 schematically illustrates the functional architecture of a redundant multiplexer, according to an embodiment of the present invention.

FIG. 7 schematically illustrates a redundant remultiplexer, according to an embodiment of the present invention.

DETAILED DESCRIPTION OF THE INVENTION

In order to understand the underlying principles of the invention, a description is first provided of the systems and system architecture described in the applications incorporated herein by reference. Source Media Routers™ ("SMR™") incorporating elements of the system described below are available from SkyStream Networks Corporation™, a company located in Sunnyvale, Calif.

Figure 1:
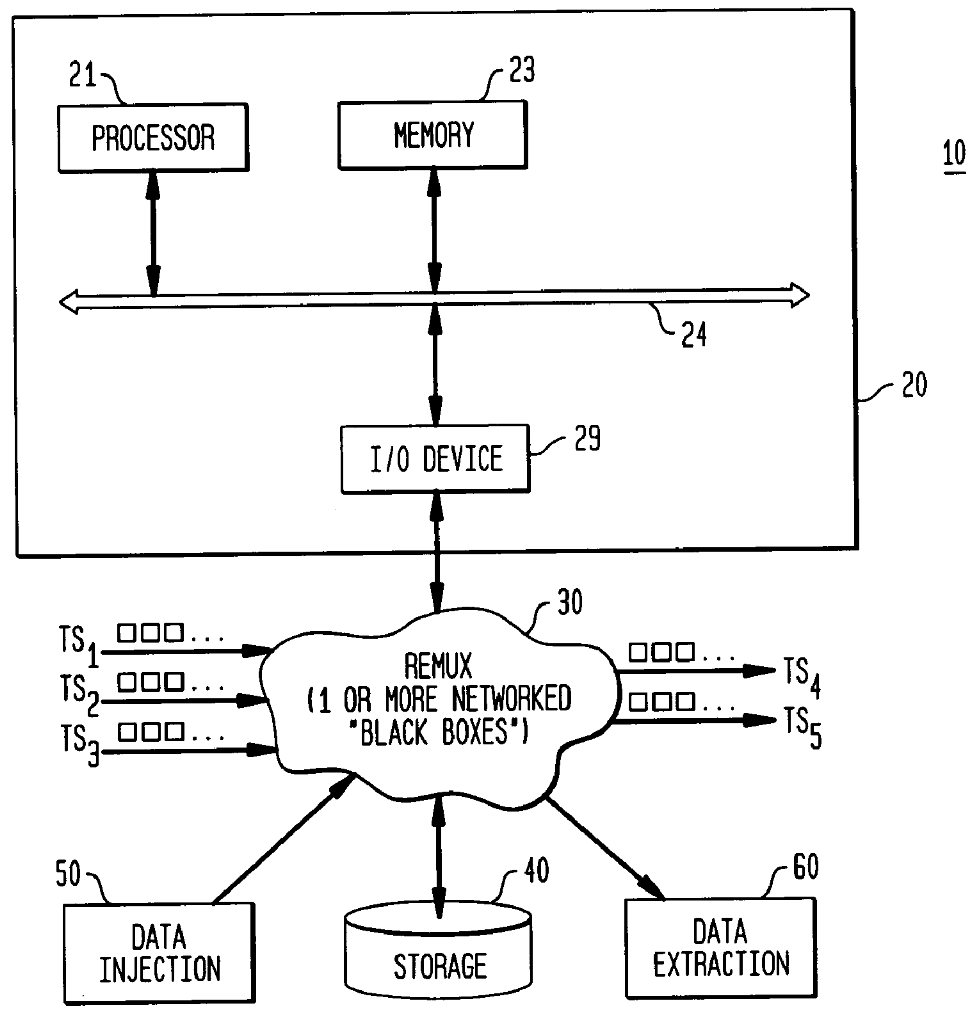
FIG. 1 shows a remultiplexing environment, according to an embodiment of the present invention.

FIG. 1 shows a basic remultiplexing environment 10 described in the applications incorporated by reference. A controller 20 provides instructions to a remultiplexer 30 using, for example, any remote procedure call (RPC) protocol, such as the digital distributed computing environment protocol (DCE), simple network management protocol (SNMP) and the open network computing protocol (ONC).

The controller 20 may be in the form of a computer, such as a PC compatible computer. The controller 20 includes a processor 21, such as one or more Intel™ Pentium III™ integrated circuits, a main memory 23, and one or more I/O devices 29 connected to a bus 24. The I/O device 29 is any suitable I/O device 29 for communicating with the remultiplexer 30, depending on how the remultiplexer 30 is implemented. Examples of such an I/O device 29 include an RS-422 interface, an Ethernet interface, a modem, and a USB interface.

The remultiplexer 30 is implemented with one or more networked "black boxes". In the example remultiplexer architecture described below, the remultiplexer 30 black boxes may be any stand-alone well known computer system that are interconnected by communications links such as Ethernet, ATM or DS3 communications links.

As shown, one or more to-be-remultiplexed transport streams ("TS's"), namely, TS1, TS2 and TS3, are received at the remultiplexer 30. As a result of the remultiplexing operation of the remultiplexer 30, one or more TS's, namely, TS4 and TS5, are outputted from the remultiplexer 30. The remultiplexed TS's TS4 and TS5 illustratively, include at least some information (at least one transport packet) from the inputted TS's TS1, TS2 and TS3. At least one storage device 40, e.g., a disk memory or server, is also provided for supplying TSs or data for input to the remultiplexer 30, for storing TS information or data produced by the remultiplexer 30, or both.

Also shown are one or more data injection sources 50 and one or more data extraction destinations 60. These sources 50 and destinations 60 may be implemented as PC compatible computers, cameras, video tape players, communication demodulators/receivers, display monitors, video tape recorders, communications modulators/transmitters, or the like. The data injection sources 50 supply TS, elementary stream ("ES") (a component signal of a program, such as one encoded video signal, one encoded audio signal, one closed-captioning signal, one entitlement control message signal, one entitlement management message signal, etc.) or other data, such as best effort data, to the remultiplexer 30, e.g., for remultiplexing into the outputted TS's TS4 and/or TS5. Likewise, the data extraction destinations 60 receive TS, ES or other data from the remultiplexer 30, e.g., that is extracted from the inputted TS's TS1, TS2 and/or TS3.

The devices 20, 40, 50 and 60 may be separated from the remultiplexer 30. In one embodiment, the devices 20, 40, 50 and 60 are part of the remultiplexer 30. Alternatively, the environment 10 may be viewed as a network. The various functions of remultiplexing may be distributed over a network. For example, multiple remultiplexer nodes having the remultiplexer node 100 architecture described in connection with FIG. 2, may be interconnected to each other by various communication links, the adaptor 110, and interfaces 140 and 150. Each of these remultiplexer nodes 100 may be controlled by the controller 20 (FIG. 1) to act in concert as a single remultiplexer 30.

Such a network distributed remultiplexer 30 may be desirable as a matter of convenience or flexibility. For example, one remultiplexer node 100 may be connected to multiple file servers or storage devices 40 (FIG. 1). A second remultiplexer node 100 may be connected to multiple other input sources, such as cameras, or demodulators/receivers. Other remultiplexer nodes 100 may each be connected to one or more transmitters/modulators or recorders. Alternatively, remultiplexer nodes 100 may be connected to provide redundant functionality and therefore fault tolerance in the event one remultiplexer node 100 fails or is purposely taken out of service.

Figure 4:
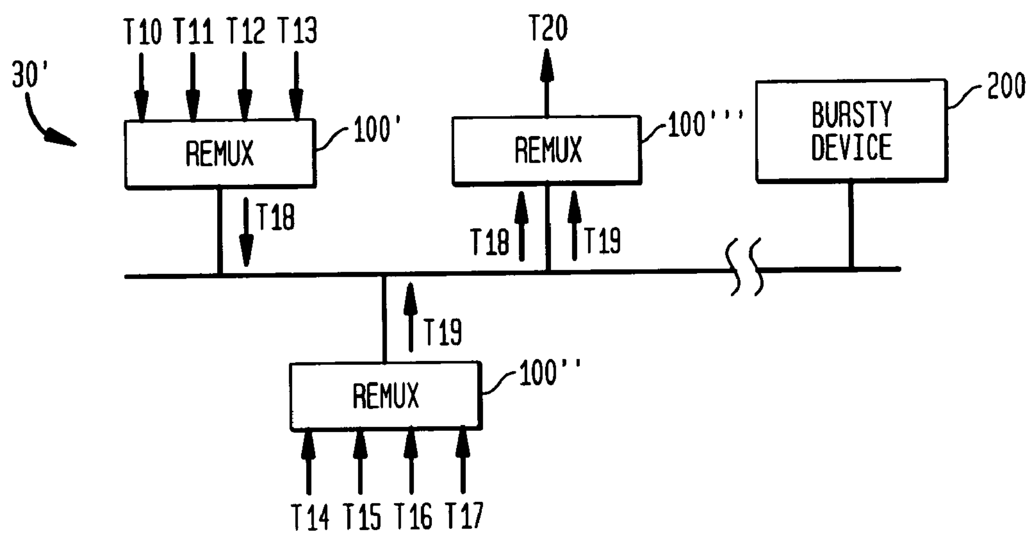
FIG. 4 shows a network distributed remultiplexer architecture, according to an embodiment of the present invention.

Consider a first network remultiplexer 30' shown in FIG. 4. In this scenario, multiple remultiplexer nodes 100', 100'', 100''' are connected to each other via an asynchronous network, such as a 100 BASE-TX Ethernet network. Each of the first two remultiplexer nodes 100', 100'' receives four TSs TS10–TS13 or TS14–TS17 and produces a single remultiplexed output TS TS18 or TS19. The third remultiplexer 100''' receives the TS's TS18 and TS19 and produces the output remultiplexed TS TS20. In the example shown in FIG. 3, the remultiplexer node 100' receives real-time transmitted TSs TS10–TS13 from a demodulator/receiver via its adaptor 110 (FIG. 2). On the other hand, the remultiplexer 100'' receives previously stored TSs TS14–TS17 from a storage device via a synchronous interface 150 (FIG. 2). Each of the remultiplexer nodes 100' and 100'' transmits its respective outputted remultiplexed TS, i.e., TS18 or TS19, to the remultiplexer node 100''' via an asynchronous (100 BASE-T Ethernet) interface 140 (FIG. 2) to an asynchronous (1000 BASE-T Ethernet) interface 140 (FIG. 2) of the remultiplexer node 100'''. Advantageously, each of the remultiplexer nodes 100' and 100'' use the above-described assisted output timing technique to minimize the variations in the end-to-end delays caused by such communication. In any event, the remultiplexer node 100''' uses the Re-timing of un-timed data technique described above to estimate the bit rate of each program in TS18 and TS19 and to de-jitter TS18 and TS19.

Optionally, a bursty device 200 may also be included on at least one communication link of the system 30'. For example, the communication medium may be shared with other terminals that perform ordinary data processing, as in a LAN. However, bursty devices 200 may also be provided for purposes of injecting and/or extracting data into the TSs, e.g., the TS20. For example, the bursty device 200 may be a server that provides Internet access, a web server a web terminal, etc.

Of course, this is simply one example of a network distributed remultiplexer. Other configurations are possible. For example, the communication protocol of the network in which the nodes are connected may be ATM, DS3, etc.

As will be described in greater detail below, each of the remultiplexer nodes 100', 100'' and 100''' may be implemented as "media control modules". The network 30' may be designed to include a switch (implemented with a "switch control module"). Preferably, the switch control module can isolate individual communication links that connect the remultiplexer nodes 100', 100'' and 100''' into separate collision domains or network segments.

Remultiplexer Architecture

FIG. 2 shows the basic processing a basic architecture for one of the network black boxes or nodes 100 of the remultiplexer 30, referred to herein as a "remultiplexer node" 100.

Illustratively, the remultiplexer node 100 may be any well-known computer architecture running a real-time OS, such as a VxWorkS™ compatible PC computer platform. The remultiplexer node 100 includes one or more adaptors 110. Each adaptor 110 is connected to a bus 130, which illustratively is a PCI compatible bus. In such a case, the adaptors 110 are PCI mezzanine cards or so-called "PMC" cards. A host memory 120 is also connected to the bus 130. A processor 160, such as an Intel™ Pentium III™ (or other superior/inferior model) integrated circuit is also connected to the bus 130. It should be noted that the single bus architecture shown in FIG. 2 may be a simplified representation of a more complex multiple bus structure. Furthermore, more than one processor 160 may be present which cooperate in performing the processing functions described below.

Illustratively, two interfaces 140 and 150 are connected to the bus 130, although they may in fact be directly connected to another bus (not shown) which in turn is connected to the bus 130 via an I/O bridge (not shown). The interface 140 illustratively is an asynchronous interface, such as an Ethernet interface. On the other hand, the interface 150 is a synchronous interface, such as a T1 interface.

FIG. 2 also shows that the remultiplexer node 100 can have an optional scrambler/descrambler (which may be implemented as an encryptor/decryptor) 170. The scrambler/descrambler 170 is for scrambling or descrambling data in transport packets. However, this scrambler/descrambler 170 is preferably omitted in lieu of providing a scrambler/descrambler 115 directly on each adaptor 110.

Each adaptor 110 is a specialized type of synchronous interface. Each adaptor 110 has one or more data link control circuits 112, a reference clock generator 113, one or more descriptor and transport packet caches 114, an optional scrambler/descrambler 115 and one or more DMA control circuits 116. These circuits may be part of one or more processors, or alternatively, may be implemented using finite state automata, i.e., as in one or more ASICs or gate arrays (PGAs, FPGAs, etc.).

The reference clock generator 113 illustratively is a 32 bit roll-over counter that counts at 27 MHz. The system time produced by the reference clock generator 113 can be received at the data link control circuit 112. Furthermore, the processor 160 can directly read or write the count of the reference clock generator 113 or set the count frequency of the reference clock generator 113.

The purpose of the cache 114 is to temporarily store the next one or more to-be-outputted transport packets pending output from the adaptor 110 or the last one or more transport packets recently received at the adaptor 110. The cache 114 also stores descriptor data for each transport packet. The purpose and structure of such descriptors is described in greater detail below. In addition, the cache 114 stores a filter map that can be downloaded and modified by the processor 160 in normal operation. In addition to the processor 160, the cache 114 is accessed by the data link control circuit 112, the DMA control circuit 116 and the optional scrambler/descrambler 115.

The DMA control circuit 116 is for transferring transport packet data and descriptor data between the host memory 120 and the cache 114. The DMA control circuit 116 can maintain a sufficient number of transport packets (and descriptors therefore) in the cache 114 to enable the data link control circuit 112 to output transport packets in the outputted, remultiplexed TS('s) continuously in sequence, (i.e., in successive time slots). The DMA control circuit 116 can also obtain control of a sufficient number of descriptor storage locations, and the packet storage locations to which they point, in the cache 114. The DMA control circuit 116 obtains control of such descriptor and transport packet storage locations for the cache 114. This enables continuous allocation of descriptors and transport packet storage locations to incoming transport packets as they are received (i.e., from successive time slots).

The data link control circuit 112 is for receiving transport packets from an incoming TS or for transmitting transport packets on an outgoing TS. When receiving transport packets, the data link control circuit 112 filters out and retains only selected transport packets received from the incoming TS as specified in a downloadable filter map (provided by the processor 160). The data link control circuit 112 discards each other transport packet. The data link control circuit 112 allocates the next unused descriptor to the received transport packet and stores the received transport packet in the cache 114 for transfer to the transport packet storage location to which the allocated descriptor points. The data link control circuit 112 furthermore obtains the reference time from the reference clock generator 113 corresponding to the receipt time of the transport packet. The data link control circuit 112 records this time as the receipt time stamp in the descriptor that points to the transport packet storage location in which the transport packet is stored.

When transmitting packets, the data link control circuit 112 retrieves descriptors for outgoing transport packets from the cache 114 and transmits the corresponding transport packets in time slots of the outgoing TS that occur when the time of the reference clock generator 113 approximately equals the dispatch times indicated in the respective descriptors. The data link control circuit 112 furthermore performs any final PCR correction in outputted transport packets as necessary so that the PCR indicated in the transport packets is synchronized with the precise alignment of the transport packet in the outgoing TS.

The processor 160 is for receiving control instructions from the external controller 20 (FIG. 1) and for transmitting commands to the adaptor 110, and the interfaces, 140 and 150 for purposes of controlling them. In response, to such instructions, the processor 160 generates a PID filter map and downloads it to the cache 114, or modifies the PID filter map already resident in the cache 114, for use by the data link control circuit 112 in selectively extracting desired transport packets. In addition, the processor 160 generates interrupt receive handlers for processing each received transport packet based on its PID. Receipt interrupt handlers may cause the processor 160 to remap the PID of a transport packet, estimate the departure time of a transport packet, extract the information in a transport packet for further processing, etc. In addition, the processor 160 formulates and executes transmit interrupt handlers which cause the processor to properly sequence transport packets for output, to generate dispatch times for each transport packet, to coarsely correct PCRs in transport packets and to insert PSI into an outputted TS. The processor 160 may also assist in scrambling and descrambling.

The host memory 120 is for storing transport packets and descriptors associated therewith. The host memory 120 storage locations are organized as follows. A buffer 122 is provided containing multiple reusable transport packet storage locations for use as a transport packet pool. Descriptor storage locations 129 are organized into multiple rings 124. Each ring 124 is a sequence of descriptor storage locations 129 from a starting memory address or top of ring 124-1 to an ending memory address or bottom of ring 124-2. One ring 124 is provided for each outgoing TS transmitted from the remultiplexer node 100 and one ring 124 is provided for each incoming TS received at the remultiplexer node 100. Additional rings 124 are provided for information to be injected into the TS, such as substitute PSI information and best effort data.

An illustrative basic operation of the remultiplexer 100 is now described. The processor 160 initially programs the remultiplexer 100 to acquire information regarding the contents of the received streams. Such information is discernable from the PSI, most notably, the PAT and PMT. The programming to achieve such acquisition is signaled by the controller 20. The processor 160 achieves the programming by judicious selection of receipt interrupt handlers specific to PID's of the received transport packets. Note that the PID's of PSI transport packets are standardized (PID 0000h for PAT, PID 0001h for CAT) or deducible from the PSI (the PAT indicating the PID's of the PMT, the PMT indicating the PID's of the ES's, ECM's, etc.).

Figure 3:
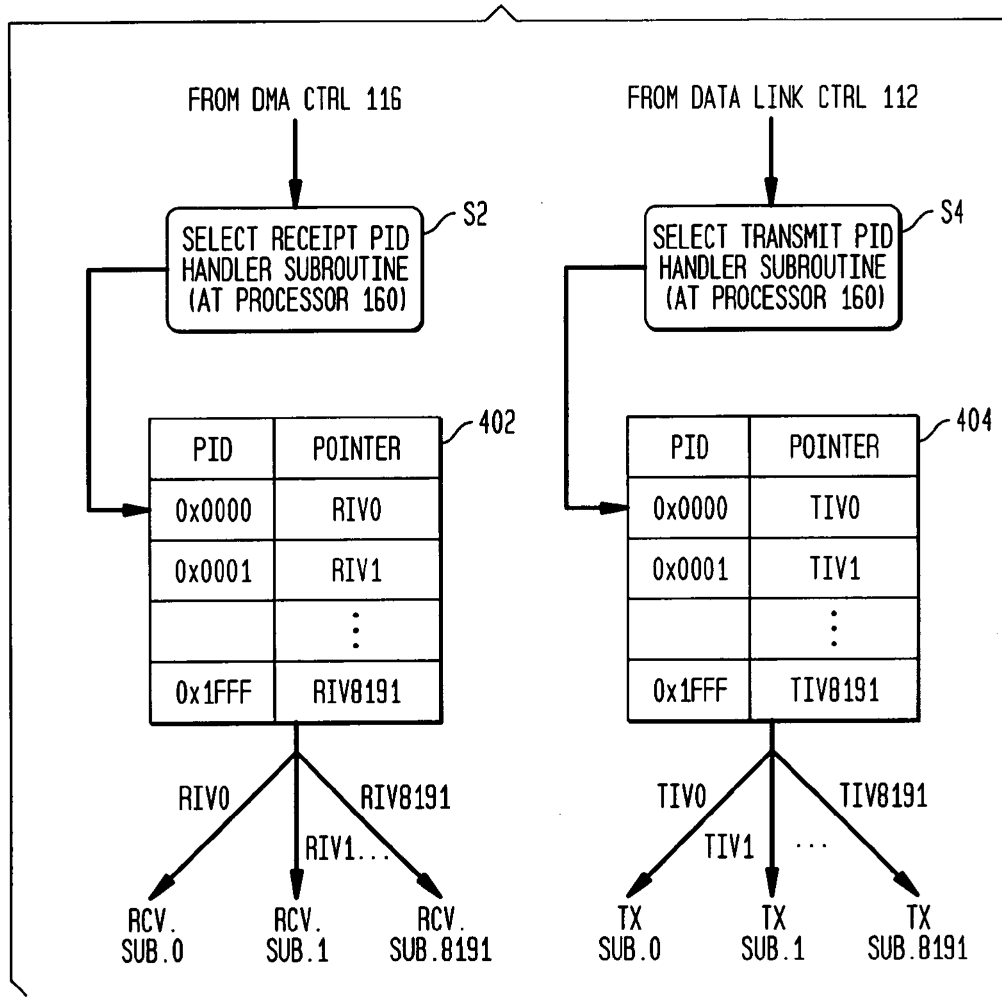
FIG. 3 shows a flowchart which schematically illustrates how transport packets are processed depending on their PIDs in a remultiplexing node, according to an embodiment of the present invention.

Illustratively, receipt interrupts are triggered by the DMA controller 116, e.g., in response to detecting a certain number of received transport packets in the cache 114. Referring to FIG. 3, the processor 160 illustratively has a set of PID handler subroutines for each adaptor 110 (or other device) that receives or transmits a TS during a remultiplexing session. FIG. 3 illustrates two types of PID handler subroutine sets, namely, a receipt PID handler subroutine set and a transmit PID handler subroutine set. Each DMA control circuit 116 generates a recognizably different interrupt thereby enabling the processor 160 to determine which set of PID handler subroutines to use. In response to the interrupt by the DMA control circuit 116, the processor 160 executes step S2 according to which the processor 160 examines the PID of each transport packet pointed to by a recently stored descriptor in the receipt queue of the interrupting adaptor 110. For each PID, the processor 160 consults a table of pointers that point to receipt PID handler subroutines 402 specific to the adaptor 110 (or other device) that interrupted the processor 160. The processor 160 then executes the interrupt handler subroutines indicated by the respective pointer.

The acquired information is communicated to the controller 20. In response to an automated program or user input, the controller 20 generates a specification for the outputted TS which is communicated to the processor 160 of the remultiplexer 100.

The processor 160 receives the user specification and responds by selecting the appropriate receive PID handler subroutines for appropriate PID's of each received, to-be-remultiplexed TS. For example, for each PID labeling a transport packet containing data that is to be retained, the processor 160 selects a subroutine in which the processor inserts the process for estimating the departure time. For each PID labeling a transport packet containing a PCR, the processor 160 can select a subroutine containing the process for setting the PCR flag and for calculating the drift (misalignment) of the PCR, and so on.

The processor 160 allocates a transmit queue to each device that transmits a remultiplexed TS, i.e., the adaptor 110 that outputs the remultiplexed TS TS3. The processor 160 furthermore loads the PID filter maps in each cache 114 of the adaptor 110 that receive the to-be-remultiplexed TS's with the appropriate values for retaining those transport packets to be outputted in a remultiplexed TS, for retaining other transport packets containing PSI, and for discarding each other transport packet.

In addition to selecting receive PID handler subroutines, allocating transmit queues and loading the appropriate PID filter map modifications, the processor 160 illustratively selects a set of transmit PID handler subroutines for each adaptor 110 (or other device) that outputs a remultiplexed TS. This is shown in FIG. 3. The transmit PID handler subroutines are selected on a PID and transmit TS basis. As above, in response to receiving an identifiable interrupt (e.g., from a data link control circuit 112 of an adaptor 110 that transmits an outputted, remultiplexed TS) the processor 160 executes step S4. In step S4, the processor 160 examines descriptors from the receipt queues (and/or possibly other queues containing descriptors of transport packets not yet scheduled for output) and identifies up to j≧1 descriptors pointing to transport packets to be outputted from the interrupting adaptor 110. The number j may illustratively be programmable and advantageously is set equal to the number k of transport packets transmitted from a specific adaptor 110 from which an outputted remultiplexed TS is transmitted between each time the specific adaptor 110 interrupts the processor 160.

With the above-noted allocation of queues, selection of PID handler subroutines, and modification of PID filter maps, remultiplexing is performed as follows. The transport packets of a TS, e.g., TS1, are received at the data link control circuit 112 of a first adaptor 110. The data link control circuit 112 consults the local PID filter map stored in the cache 114 and selectively discards each transport packet having a PID indicating that the transport packet is not to be retained. Each data link control circuit 112 retrieves the next unused/non-allocated descriptor from the cache 114 and determines the transport packet storage location associated with the descriptor. The data link control circuit 112 obtains the time of the reference clock generator 113 corresponding to the time the first byte of the transport packet is received and stores this value as the receipt time stamp in the field 129-5 of the allocated descriptor. The data link control circuit 112 stores the number of bytes of the received transport packet in the field 129-8. Also, if any errors occurred in receiving the transport packet (e.g., loss of data link carrier of TS1, short packet, long packet, errored packet, etc.), the data link control circuit 112 indicates such errors by setting appropriate exception bits of 129-6. The data link control circuit 112 then sets a bit in the status field 129-7 indicating that the descriptor 129 has been processed or processed with exceptions and stores the transport packet at the transport packet storage location of cache 114 pointed to by the pointer in field 129-4.

The DMA control circuit 116 writes the transport packet to its corresponding transport packet storage location of transport packet pool 122 in the host memory 120. The DMA control circuit 116 also writes data of the descriptor that points to the written transport packet to the respective descriptor storage location 129 of the receipt queue assigned to the respective adaptor 110. Note that the DMA control circuit 116 can identify which transport packets to write to the host memory 120 by determining which descriptors have the processing completed status bits in the field 129-7 set, and the transport packet storage locations to which such descriptors point. The DMA control circuit 116 writes data of a sequence of i≧1 multiple completed descriptors and transport packets.

In one embodiment, a scrambler/descrambler circuit 115 is placed on the adaptor 110. In such a case, prior to the DMA control circuit 116 writing data of a transport packet to the host memory 120, the scrambler/descrambler circuit 115 descrambles each transport packet for which descrambling must be performed.

When the DMA control circuit 116 writes descriptor data and transport packets to the host memory 120, the DMA control circuit 116 interrupts the processor 160. The interrupt causes the processor 160 to execute one of the receipt PID handler subroutines for each transport packet which is both PID and input TS specific. As noted above, the receipt PID handler subroutines are selected by appropriate alteration of the pointers in the table 402 so that the processor 160, amongst other things, discards transport packets not to be outputted in the remultiplexed TS, writes an estimated departure time in the descriptors pointing to transport packets that are to be outputted and sets the PCR flag bit in the descriptors pointing to transport packets containing PCR's.

Contemporaneously while performing the above functions associated with receiving transport packets, a DMA control circuit 116 and data control link circuit 112 on a second adaptor 110 also perform certain functions associated with transmitting transport packets in the outputted remultiplexed TS, i.e., TS3. Each time the data link control circuit 112 of this second adaptor 110 outputs k≧1 transport packets, the data link control circuit 112 generates a transmit interrupt. This transmit interrupt is received at the processor 160 which executes an appropriate transmit PID handler subroutine for the outputted remultiplexed TS TS3. In particular, the processor 160 examines the descriptors at the head of each queue that contains descriptors pointing to transport packets to be outputted in TS3. In addition to the receipt queue associated with each received transport stream TS1, the processor 160 may allocate additional "connection" queues containing descriptors pointing to transport packets to be outputted in TS3. The processor 160 identifies the descriptors pointing to the next j transport packets to be outputted in TS3. This is achieved by executing the transmit PID handler subroutines of the set associated with the second adaptor 110 and indexed by the PIDs of the transport packets in the head of the receipt queues. If the transport packet corresponding to the descriptor in the queue examined by the processor 160 is to be outputted from the second adaptor 110 (that generated the interrupt), the PID of the transport packet will index a pointer to a transmit PID handler subroutine that will: (1) allocate a transmit descriptor for the transport packet, (2) order the transmit descriptor in the transmit queue associated with the second adaptor 110 in the correct order for transmission, (3) assign an actual dispatch time to the allocated descriptor and transport packet and (4) perform a coarse PCR correction on the transport packet for drift and latency, if necessary. Illustratively, the processor 160 examines descriptors in (receipt) queues until j descriptors pointing to transport packets to be outputted in TS3 or from the second adaptor 110 are identified. The descriptors are examined in order from head 124-3 to tail 124-4. If multiple queues with candidate descriptors are available for examination, the processor 160 may examine the queues in a round-robin fashion, in order of estimated departure time or some other order.

The DMA control circuit 116 retrieves from the host memory 120 data of a sequence of j≧1 descriptors of the queue associated with the second adaptor 110. The descriptors are retrieved from the descriptor storage locations 129 of the queue in order from head pointer 124-3 to tail pointer 124-4. The DMA control circuit 116 also retrieves from the host memory 120 the transport packets from the transport packet storage locations of the pool 122 to which each such retrieved descriptor points. The DMA control circuit 116 stores such retrieved descriptors and transport packets in the cache 114.

The data link control circuit 112 sequentially retrieves from the cache 114 each descriptor in the transmit queue, in order from the head pointer 124-3, and the transport packet in the transport packet storage location to which the descriptor points. When the time of the reference clock generator 113 of the second adaptor 110 equals the time indicated in the dispatch time field 129-5 of the retrieved descriptor, the data link control circuit 112 transmits the transport packet, to which the descriptor (in the storage location pointed to by the head pointer 124-3) points, in TS3. The dispatch time is only the approximate transmit time because each transport packet must be transmitted in alignment with the transport packet time slot boundaries of TS3. Such boundaries are set with reference to an external clock not known to the processor 160 (such as the reference time clock 113 in the adaptor 110 from which TS3 is transmitted). Note also, that the PCR's of each transport packet may be slightly jittered for the same reason. Accordingly, the data link control circuit 112 furthermore finally corrects the PCR's according to the precise transmit time of the transport packet that contains it.

After transmitting a transport packet, the data link control circuit 112 sets the appropriate status information in field 129-7 of the descriptor that points to the transmitted transport packet and deallocates the descriptor. The DMA control circuit 116 then writes this status information into the appropriate descriptor storage location of the transmit queue.

The above-incorporated by reference patents describe various features of the remultiplexer 100 in greater detail including:

(1) The remultiplexer 100 can optimize the transport stream by replacing null transport packets with other data bearing transport packets on hand. It should be noted that sometimes an input transport stream does not have null transport packets but instead has empty timeslots in which no transport packet whatsoever is conveyed. The remultiplexer 100 can also insert data bearing transport packets into such slots. Note that null transport packets are discarded anyway upon receipt (null transport packets can be regenerated for insertion into an externally outputted transport stream when no data, i.e., no program data and no to-be-added data is available) and so the empty timeslot situation is treated the same way as the timeslot carrying a null transport packet.

(2) The adapter 100 can use the timing function of the clock 113 and data link circuit 112 to cause the corresponding transport packet to be transmitted by one of the interfaces 140 or 150 at an approximate time. The interfaces 140 and 150 usually cannot transmit precisely at a given clock time for a variety of reasons. For example, an Ethernet interface may be connected to a contentious carrier sense multiple access ("CSMA") communications medium. In other words, each device connected to the medium senses whether or not the medium is currently in use, and if not, can start transmitting packets according to its own clock. Sometimes, when it is desired to transmit, the medium is busy carrying information of another device. At other times, a collision occurs (two devices contemporaneously detecting the medium as available attempt to transmit contemporaneously) causing a random length delay before retransmission can be reattempted. Nevertheless, the technique can be used to approximately cause packets to be transmitted at the appropriate time. To that end, the processor 160 can generate PID handler subroutines which cause the to-be-transmitted packets to be enqueued for transfer by the interface 140. An adaptor 110 is assigned to "assist" in the timely transmission of such enqueued packets. As above, the data link control circuit 112 retrieves each descriptor from the cache and determines, based on the indicated dispatch time recorded in field 129-5, when the corresponding transport packet is to be transmitted relative to the time indicated by the reference clock generator 113. (Note, in this embodiment, it is irrelevant whether or not the DMA control circuit 116 obtains control of a copy of the packets or not. A copy of the packets is made available for transmission by the interface 140 without contention from the DMA control circuit 116.) Approximately when the time of the reference clock generator 113 equals the dispatch time, the data link control circuit 112 generates an interrupt to the processor 160 indicating that the transport packet should be transmitted now. In response, the processor 160 examines the appropriate table of pointers to transmit PID handler subroutines and execute the correct transmit PID handler subroutine. In executing the transmit PID handle subroutine, the processor 160 issues a command or interrupt for causing the interface 140 to transmit a transport packet. This causes the very next transport packet to be transmitted from the output port of the interface 140 approximately when the current time of the reference clock generator 113 matches the dispatch time written in the descriptor corresponding to the transport packet. It is important to note, however, that the inventive remultiplexer preferably uses a full-duplex gigabit Ethernet protocol (such as full-duplex Media Access Control), in lieu of CSMA. As is known, full-duplex MAC provides contention-free access that provides a substantially constant transmission delay, with only a small delay variation. Although the variation in this delay is fairly constant, there will be unpredictable delays due to the queuing of the remultiplexer switch.

(3) The remultiplexer 100 can re-create receipt timing for packets received via an asynchronous interface so that they can be retransmitted within the buffer model and timing constraints required by the MPEG-2 standard. That is, packets received by an asynchronous interface generally contain some jitter as precise transmission timing cannot be guaranteed. Furthermore, most asynchronous interfaces are not provided with clocks for issuing receipt time stamps indicating receipt timing at the tolerance required in MPEG-2. Nevertheless, received packets can be buffered in order of receipt, and the transmission rate be discerned piece-wise for each program. Among other things, the processor 160 provides receipt PID handler subroutines for packets carrying PCRs including the following steps. The first time a PCR bearing transport packet is received for any program, the processor 160 obtains a time stamp from the reference clock generator 113 of any adaptor 110 (or any other reference clock generator 113 that is synchronously locked to the reference clock generators 113 of the adaptors 110). The obtained time stamp is assigned to the first ever received PCR bearing transport packet of a program as the receipt time of this transport packet. Note that other to-be-remultiplexed transport packets may have been received prior to this first received PCR bearing transport packet. The known internal buffering delay at the remultiplexer node 100 may be added to the receipt time stamp to generate an estimated departure time which is assigned to the transport packet (containing the first ever received PCR of a particular program).

After the second successive transport packet bearing a PCR for a particular program is received, the processor 160 can estimate the transport packet rate between PCRs of that program received via the asynchronous interface 140. First, the processor 160 forms the difference between the two successive PCRs of the program. The processor then divides this difference by the number of transport packets of the same program between the transport packet containing the first PCR and the transport packet containing the second PCR of the program. This produces the transport packet rate for the program. The processor 160 estimates the departure time of each transport packet of a program between the PCRs of that program by multiplying the transport packet rate for the program with the offset or displacement of each such transport packet from the transport packet containing the first PCR. The offset is determined by subtracting the transport packet queue position of the transport packet bearing the first PCR from the transport packet queue position for which an estimated departure time is being calculated. (Note that the queue position of a transport packet is relative to all received transport packets of all received streams.) The processor 160 then adds the estimated departure time assigned to the transport packet containing the first PCR to the product thus produced. The processor 160 illustratively stores the estimated departure time of each such transport packet in the field 129-10 of the descriptor that points thereto.

After assigning an estimated departure time stamp to the transport packets of a program, the processor 160 may discard transport packets (according to a user specification) that will not be outputted in a TS. The above process is then continuously repeated for each successive pair of PCRs of each program carried in the TS. The data of the descriptors with the estimated departure times may then be transferred to the appropriate transmit queue(s) in the course of the processor 160 executing transmit PID handler subroutines. Note also that initially some transport packets may be received for a program prior to receiving the first PCR of that program. For these transport packets only, the transport packet rate is estimated as the transport packet rate between the first and second PCR of that program (even though these packets are not between the first and second PCR's). The estimated departure time is then determined.

(4) Various components of the remultiplexer 100 can be distributed in a network. In one network, components are connected together by asynchronous interfaces, such as Ethernet interfaces.

(5) PCRs can be coarsely corrected if the transmission timeslot of a packet containing a PCR must be changed relative to the other packets of the same program. This correction is performed by the processor 160 in the course of assigning a transmission time for the packet containing the PCR (and prior to actual transmission).

(6) At the time of actual transmission, the data link circuit 112 can perform any fine correction to a PCR incurred due to imperfect alignment of the timeslot edges in the externally outputted transport stream, and the transmission time assigned to the packet.

(7) The remultiplexer 100 has a technique to distribute a single time base originating from a centralized clock to the adaptors 110 to keep them accurately synchronized. A technique is provided for use in a network distributed remultiplexer.

(8) Techniques are provided for scrambling and descrambling including efficiently keeping track of control words.

U.S. patent application Ser. No. 09/393,227 describes a manner by which a data source 50 can provide information to a data injector node. The data injector node can be implemented using the remultiplexer architecture 100. The technique described in this application uses a point-to-point connection oriented protocol such as TCP (although Novell's™ IPX/SPX™ or Microsoft's ™ Netbui™ can also be used) to control the flow of data from the data source 50. Specifically, the data injector 100 optimizes bandwidth by replacing null transport packets or empty timeslots with useful information whenever they occur (provided useful information is on hand). The occurrence of such opportunities is unpredictable. The data source 50 could theoretically overwhelm the data injector 100 by producing data faster than it can be injected. TCP controls the flow of data to the data injector 100. Specifically, when the data source 50 and the data injector 100 establish the TCP connection, a data window, or maximum amount of, unacknowledged transferred data is specified. The data injector 50 will produce and transfer TCP to the data injector 100 TCP packets containing data. As each TCP packet is prepared, the data source 50 reduces the available window by an amount equal to the amount of data in the TCP packets. The data source 50 will send to the data injector 100 no more than an amount of data in the data window, and in fact will cease packet production if the window is reduced to zero.

The data injector 100 receives and processes the TCP packets (as described below). As the data injector 100 is able to successfully insert the data provided by the data source 50, the data injector 100 transmits to the data source 50 acknowledgement packets acknowledging receipt of various TCP packets previously transmitted. When the data source 50 receives an acknowledgement packet, the data source increases the size of the data window by an amount equal to the amount of data acknowledged as received. This may enable the data source 50 to resume production and transmission of TCP packets. This technique effectively throttles the transfer of data to the data injector 100 and prevents overflow.

Figure 5:
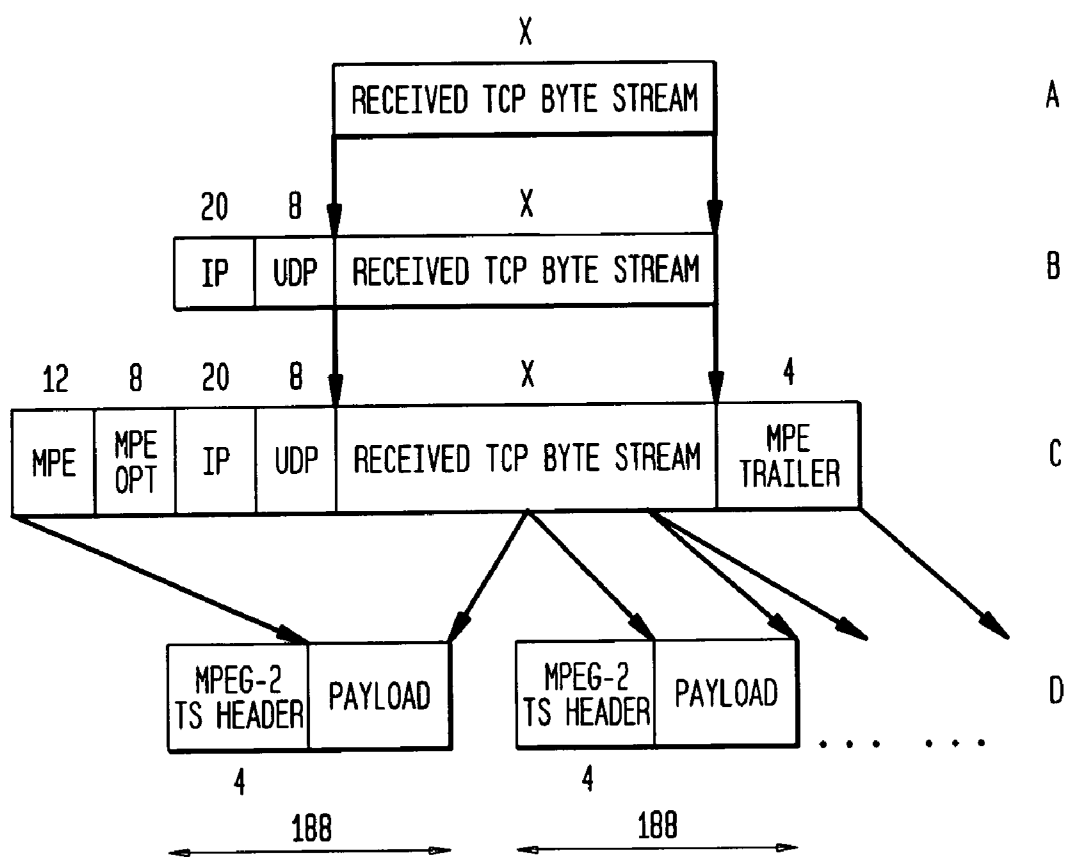
FIG. 5 illustrates a process for reformatting data at the data injector node, according to an embodiment of the present invention.
Figure 6:
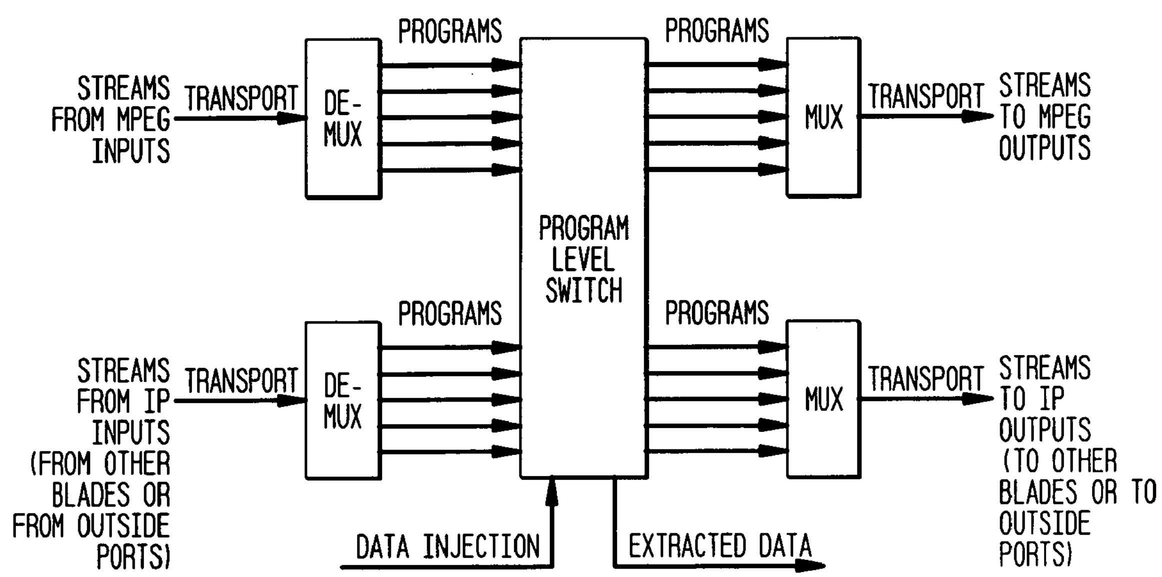
FIG. 6 schematically illustrates the functionality of a redundant multiplexer, according to an embodiment of the present invention.

As noted, the data injector 100 receives TCP packets and processes them. Initially, the processor 160 of the data injector 100 extracts the best effort data from the TCP packets. The processor reformats the best effort data into a format suitable for point-to-multipoint transmission. FIG. 5 illustrates an exemplary reformatting scheme. First, in step A, the processor 160 recovers the original TCP byte stream from the TCP segments. This is achieved by the processor 160 extracting the best effort data from the TCP (and other protocol encapsulation) packet payload and reassembling the original data unit. Next, as shown in step B, the processor 160 forms a UDP/IP "datagram" including the entire recovered data unit as the payload. As shown, the processor 160 propends an eight byte UDP packet header and a twenty byte IP header to the recovered data unit. Step C is an optional step by which a standard or proprietary encapsulation is added by the processor 160. For example, the processor 160 can add multi-protocol extension ("MPE") encapsulation to the UDP/IP datagram. In such a case, the processor 160 propends a twelve byte MPE header and optionally propends an eight byte MPE optional header field to the UDP/IP packet. The processor 160 also appends a four byte MPE trailer to the UDP/IP packet. Next, as shown as step D, the processor 160 segments the MPE/UDP/IP datagram into transport stream packet payloads of up to 184 bytes. If necessary, the processor 160 adds padding bytes to the end of transport packets containing less than 184 bytes of MPE/UDP/IP packet data. (Note also that the transport packet payload may contain other information. For example, the first transport packet containing the start of the header of the MPE/UDP/IP datagram includes a one byte pointer. The total amount of payload data is always 184 bytes and may include different combinations of the MPE/UDP/IP packet data, padding bytes and other bytes.) The processor 160 then propends a four byte transport packet header to each 184 byte payload thus formed. The transport packets contain a PID which appropriately enables receivers to identify such transport packets as bearing best effort data. Such data bearing transport packets can then be enqueued into an appropriate queue associated with an adaptor and made available for insertion into an externally transmitted TS.

Redundant Remultiplexer Functionality

FIG. 5 illustrates one embodiment of a redundant remultiplexer from a functional point of view. In particular, the redundant remultiplexer is functionally shown as an MPEG program level switch 300. Switch 300 receives MPEG programs 325 from a variety of inputs 310, such as: ASI inputs (from satellite receivers or other multiplexers), network inputs from various packet-switching technologies (Ethernet, ATM) and using different network protocols (UDP/IP, RTP/UDP/IP, raw AAL-5), and uncompressed (analog or digital) audio/video inputs to an encoder module. Once the MPEG programs are received by the remultiplexer, it will individually route each program to one or more outputs 320. Preferably, the remultiplexer also extracts injected packet data 330 from the incoming MPEG stream as per the ETSI EN 301 192standard, and retransmits this data over its network outputs (Ethernet or ATM) 340. The MPEG programs 325 can be routed to ASI outputs or network outputs (Ethernet, ATM) using a number of different network protocols (UDP/IP, RTP/UDP/IP, raw AAL-5). The remultiplexer can also receive packet data from the network (over Ethernet or ATM), packetize it into an MPEG transport stream as per ETSI EN 301 192, and transmit this data out over ASI outputs. This process is illustrated in FIG. 5.

For the input data, the remultiplexer preferably performs several functions. First, if the input data is analog or digital uncompressed audio and video, then the remultiplexer encodes the audio/video stream into MPEG, as per ISO/IEC 13818.

Second, if the input data is a transport stream coming into an ASI port, with pre-encoded MPEG, then the remultiplexer parses the System Information tables (as per ISO/IEC 13818-1 and ETSI EN 300 468) to identify the individual programs, and makes this information available to the output ports. Third, the remultiplexer preferably extracts and reassembles injected IP datagrams, as per ETSI EN 301 192.

Similarly for the output data, the remultiplexer preferably performs several functions. First, the remultiplexer rebuilds the System Information tables to reflect the streams present on that particular output, in a manner compliant with ISO/IEC 13818-1 and ETSI EN 300 468. Second the remultiplexer formats the output data to comply with the particular type of output port. In particular, for ASI output ports, the transport packets are re-timed to comply with the timing models presented in ISO/IEC 13818-1 and the PCR values are corrected. Further, for network output ports, the transport packets are grouped into UDP or RTP payloads, and the final packet is formed to be transmitted on the wire. PCR values are corrected as well. Third, the remultiplexer segments IP datagrams to be injected into the output transport stream as per ETSI EN 301 192, and actively manages the bandwidth allocated to such traffic by using the models described in RFCs 2597 and 2598.

Redundant Remultiplexer Architecture

FIG. 7 shows a redundant remultiplexer 500 according to the invention. This redundant remultiplexer 500 incorporates various elements of the remultiplexers 30 and 100 described above. The redundant remultiplexer 500 is designed to enable seamless operation in the event of component failure.

The redundant remultiplexer 500 may be designed with an equipment bay/cabinet type of housing, referred to herein as a chassis, with one or more shelves into which modules may be installed. Such a chassis design allows for easy component-wise access, maintenance, repair and replacement.

As shown, the redundant remultiplexer includes a backplane 510, which may consist of a very large printed circuit board with multiple connectors. A printed circuit board or "blade" may be inserted into a slot of the redundant remultiplexer 500 chassis and mate with a respective connector. The backplane 510 illustratively has conductor traces for providing each of the signal connections described hereinafter between modules (which, as described below, are implemented as blades that can be plugged into the slots) of the redundant remultiplexer 500.

The redundant remultiplexer 500 is shown as possessing two different types of modules 520 and 530, namely, media control modules 520 and switch control modules 530, although others not shown could be provided. Illustratively twelve total media control modules 521-1, 521-2, . . . , 521-*n*, 522-1, 522-2, . . . , 522-*n* are provided, namely, six media control modules 521-1, 521-2, . . . ,521-*n* functioning as primary media control modules and six media control modules 522-1, 522-2, . . . , 522-*n* functioning as backup media control modules. Also, the redundant remultiplexer 500 illustratively has two switch control modules, namely, a switch control module 531 functioning as a primary switch control module and a switch control module 532 functioning as a backup switch control module 532. As described in greater detail below, the media control modules 521-1 to 521-*n* are preferably identical to the media control modules 522-1 to 522-*n*. Collectively, any given media control module 520 can be assigned dynamically the role as a primary module or backup module by simple control signals or commands. Likewise, the switch control module 531 is preferably identical to the switch control module 532. The software running on these modules automatically negotiates the primary and backup statuses of the switch control module. The operation of these modules 521-1 to 521-*n*, 522-1 to 522-*n*, 531 and 532 is described in greater detail below.

Each module 520 or 530 illustratively is implemented as a blade which can be inserted into a slot. In addition to connecting to signal conductors of the backplane 510, each module 520 or 530 may also have front-accessible connectors for providing conductor connections for receiving signals originating external to the redundant remultiplexer 500, or for transmitting signals externally from the redundant remultiplexer 500.

The media control modules 520 may be implemented with an architecture similar to the remultiplexer 100 described above. That is, the media control modules 520 can have any well-known computer architecture and may possess one or more adaptors 110 (illustratively up to four adaptors 110 per media control module 520) connected as PMC cards to a PCI bus thereof. Also, illustratively two Intel™ Pentium III™ processors 160 are provided and the processing tasks are preliminarily divided between the processors 160. An interface (not shown) is provided for receiving other control signals (failure signals, clock signals, etc.) used in the management of the media control module 520, e.g., by dedicated signal conductors of the backplane 510. Furthermore, the adaptors 110 are designed so that they can logically (i.e., by control instruction or signal) disable their output of a transport stream but nevertheless perform all other operations. The purpose of this feature as described below is to provide for quick restoration of output signals in the event of a failure.

The media control modules 520 have one or more special interfaces 140 or 150 which communicate certain control signals via the backplane 510. For example, each media control module 520 can generate a signal on a respective conductor of the backplane 510 indicating whether or not the blade carrying the media control module 520 is properly inserted or removed from its respective slot. Illustratively, the media control module 520 can report other status monitoring information via a respective interface 140 or 150. These signals are sensed by the switch control modules 530, for example, for purposes of detecting or diagnosing failures. Furthermore, the media control modules 520 can receive a distributed clock signal from whichever of the two switch control modules 531 or 532 is currently active. One separate conductor may be provided from each switch control module 531 or 532 to each respective media control module 520. Such a signal can be used in a software PLL to adjust the reference time clock 113 of the adapters of that media control module 520.

Figure 8:
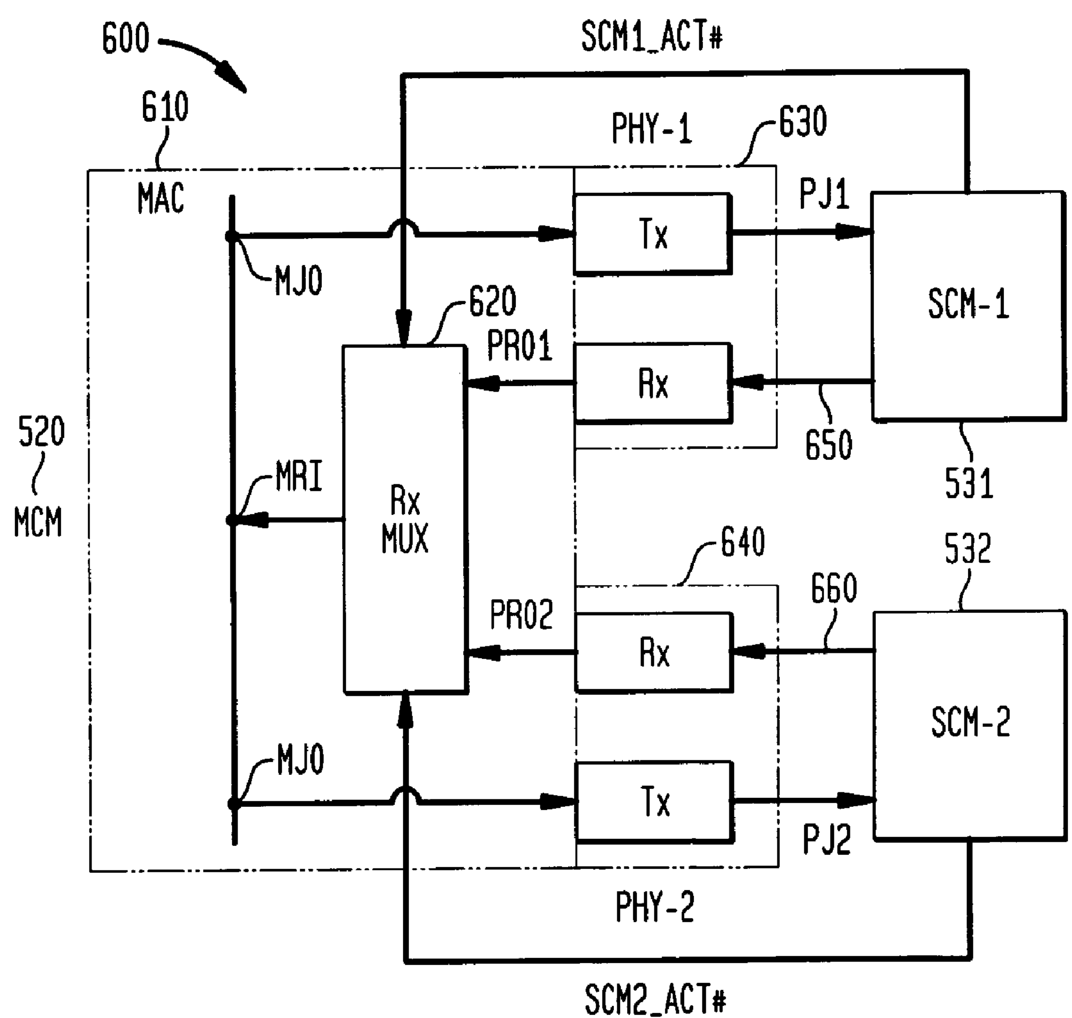
FIG. 8 schematically illustrates a gigabit Ethernet interface, according to an embodiment of the present invention.

Illustratively, each media control module 520 is provided with a special type of gigabit Ethernet interface 600 for use as an asynchronous interface 140. FIG. 8 shows certain details regarding this gigabit Ethernet interface 600 according to the invention. As shown, the Ethernet interface 600 has a media access control (MAC) 610 circuit with a transmit input (MTI) a transmit output (MTO) a receive output (MRO) and a receive input (MRI).

MRI is connected to an output of a receive multiplex or switch 620. The switch 620 has two switchable inputs connected to receive outputs (PRO1, PRO2) of two physical layer transceivers (PHYs) 630 and 640. The switch 620 receives one or more control signals, in this case SCM1_ACT# and SCM2_ACT#, for causing the switch to select the signal on PRO1 or PRO2 for output to MRI. As described in greater detail below, these signals SCM1_ACT# and SCM2_ACT# indicate which of the two switch control modules 531 or 532 is currently active. In effect, these signals cause the receipt of packets from the communications link connected to only the active switch control module 531 or 532, and not the inactive switch control module 532 or 531. It should be noted that a switch 620 with more selectable inputs could be used if more than two PHY transceivers (i.e., connected by separate Ethernet communication links to more than two other modules) are to be accommodated.

MTO is commonly connected to the transmit inputs (PTI1, PTI2) of the PHY transceivers 630 and 640. Each of the PHY transceivers 630 and 640 is connected to a unique Ethernet communications link 650 or 660, respectively. As such, the PHY transceivers 630 and 640 output the same information (often, contemporaneously) on their respective Ethernet communication links 650 or 660, namely, packet data to be transmitted by the media control module 520 in which the Ethernet interface 600 resides. The PHY transceivers 630 and 640 also receive signals from their respective Ethernet communication links 650 or 660, although, as noted above, the switch 620 only permits one signal to be received at the MAC circuit 610 at any time.

Illustratively, the media control modules 520 can each perform all of the functions described above for the remultiplexer 100. Thus, the media control modules 520 are for receiving transport stream signals and other data signals or for transmitting transport stream signals and other data signals. The data link circuits 112 on the adaptors 110 of the media control modules 520 function as external input ports or external output ports for receiving or transmitting TS streams from or to external devices. Illustratively, the data link control circuits 112 can terminate DVB ASI communication links. The media control modules 520 also perform the kind of remultiplexing operations described above. It is possible for a media control module 520 to receive certain TS's on one or more adaptors 110 thereof, remultiplex the information in the received signals and transmit one or more remultiplexed signals from one or more other adaptors 110 thereof.

Illustratively, a media control module, including an input module, e.g., the media control module 521-1, receives one or more TS's via external input ports of its one or more adaptors 110. The input module 521-1 filters out selected packets and records receipt time stamps for each received and retained transport packet in a respective descriptor pointing to the received packet. The processor(s) 160 of the input module 521-1 performs various kinds of remultiplexing processing on the received and retained TS packets, including, for example, estimating the departure time of the TS packets, ordering the TS packets for transmission and PCR correction. TS packets received by input modules 521-1 illustratively are transferred from the input modules 521-1 to the switch control module 531 or 532 for switching to an appropriate output module, e.g., the media control module 521-2. To that end, the processor(s) 160 illustratively also encapsulate the TS packets, or their contents, into IP packets prior to transmission to the switch control modules 531 and 532. The processor(s) 160 can perform different kinds of IP encapsulation.

For example, the processor(s) 160 can be programmed to identify received and retained TS packets containing non-program (e.g., non-time sensitive data or best effort data). The processor(s) decapsulates such non-program information from its TS packet and respective MPE encapsulation. The processor(s)160 can aggregate such decapsulated data, e.g., to recover an original UDP/IP packet or other convenient data segment. The processor(s) 160 can then form such information into an IP packet, including a suitably chosen destination address. For example, the destination address can be a multicast address assigned to an output port (at an adaptor 110 of an output module 521-2) from which the contents of the IP packet so formed is inevitably to be outputted externally. In another example, the processor(s) 160 can identify each received, retained TS packet bearing program data. The processor(s) 160 can simply form such TS packets into one or more real-time protocol ("RTP")/UDP/IP packets, by appending the appropriate RTP, UDP, and IP headers. Illustratively, the UDP header includes a predetermined UDP port number. As is known, RTP packets carry the lower 32 bits of the PTS of an access unit (encoded video picture or encoded audio frame) in the RTP header. According to the invention, the processor(s) 160 can place the receipt time or the departure time in this same field (as both are 32 bits long). This is possible if the RTP packets are intended to remain entirely internal to the remultiplexer 500. In such a case, each RTP/UDP/IP packet can contain one TS packet.

Input modules can use the "assisted output timing" technique described above for scheduling transmission of IP packets (RTP/UDP/IP packets containing TS packets or IP packets containing non-program information extracted from externally received TS packets) on the Ethernet interface 600 to the switch control module 531 or 532. As described below, the switch control modules 530 receive such packets and transmit them to output modules 521-2. The processor(s) 160 in the output modules 521-2 illustratively processes such packets including: decapsulating TS packets from RTP/UDP/IP packets; decapsulating, segmenting and forming non-program data of received IP packets into outgoing TS packets, assigning receipt, departure or dispatch time stamps to TS packets; ordering TS packets for transmission, correcting PCR's, etc. The processor(s) of the output modules 521-2 can use the time stamp information in the RTP packets in timing the TS packets contained therein or the TS packets can be re-timed using the technique described above.

Figure 9:
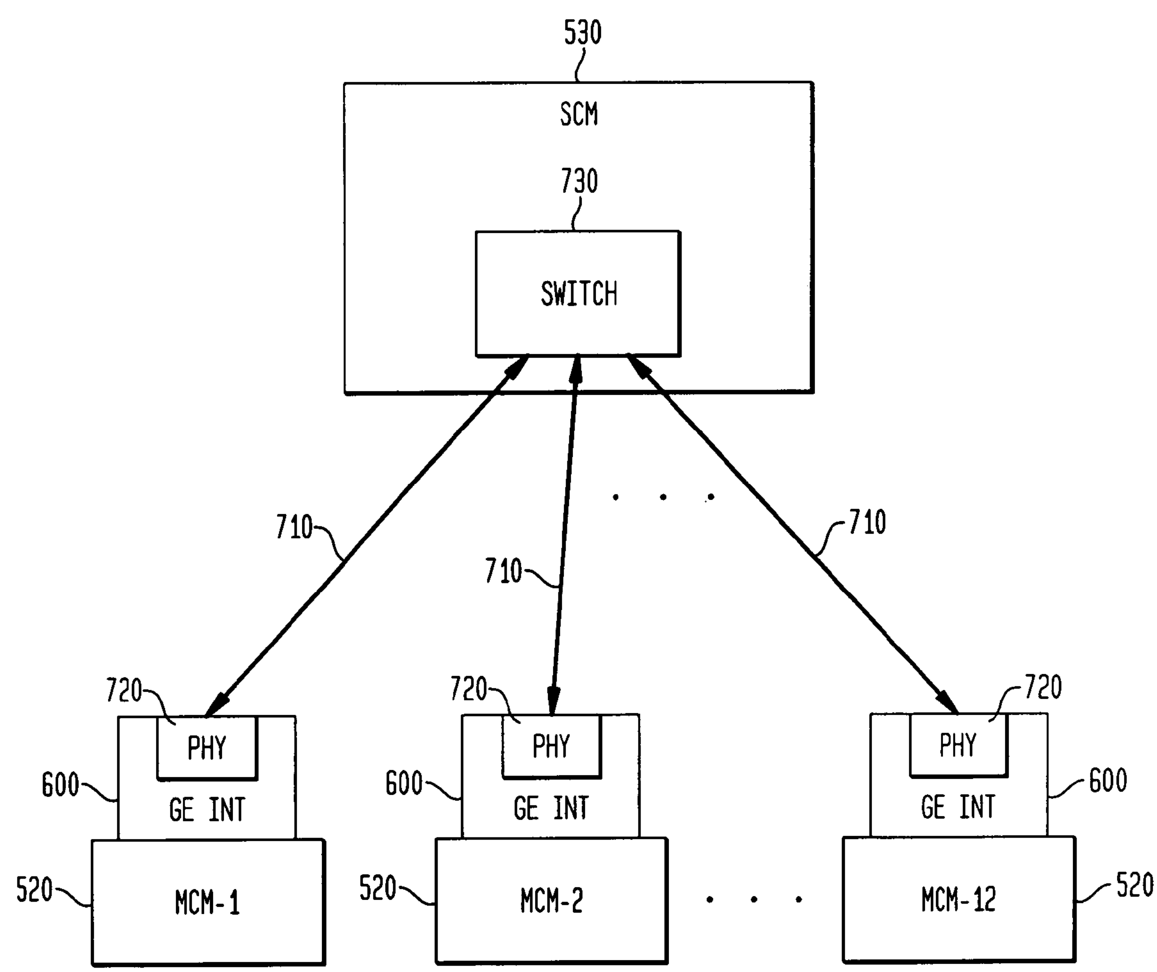
FIG. 9 schematically illustrates a switch control module, according to an embodiment of the present invention.

FIG. 9 shows one embodiment of a switch control module 530. The switch control modules 530 are for transferring individual packets between various sources and destinations. Each switch control module 530 is connected for two-way communication with the media control modules 520. Illustratively, each switch control module 530 has a respective separate communication link 710 with each of the media control modules. In the case that each media control module 520 communicates packets via a gigabit Ethernet interface 600, each switch control module 530 has a respective gigabit Ethernet physical layer circuit 720 for terminating each Ethernet communication link 710 to each gigabit Ethernet interface 600 of each media control module 520. The switch control modules 530 may also have a gigabit Ethernet switch 730 for switching packets between each of the individual Ethernet interfaces 600. The use of a switch 730 enables isolation of each individual communication link into a separate collision domain/network segment. However, a "flat" hub may also be used whereby more than one link is connected into the same collision domain/network segment under appropriate circumstances such as low traffic. Illustratively, the CXE-16 gigabit Ethernet switch 730, available from SwitchCore™, a company located in San Jose, Calif., may be used for switching the packets amongst the individual gigabit Ethernet links. Such a device has 16 10/100/1000 Mbit/s Ethernet MAC circuits in a single integrated circuit chip for accommodating 16 separate gigabit Ethernet communication links 710. This switch device 730 can switch packets between the various communication links 710 it connects at the L2 (data link) layer (e.g., on MAC addresses), the L3 (network) layer (e.g., on IP addresses), or the L4 (transport) layer (e.g., on TCP or UDP port numbers). Thus, the switch device 730 can use address information in a packet received via one of its Ethernet physical layer circuits 720 and transmit that packet onto another Ethernet physical layer circuit 720. The switch device 730 can do this on a packet by packet basis. As such, two (or more) different packets received at any one physical layer circuit 720 (e.g., from a single input module) can be switched, i.e., transmitted, to mutually different physical layer circuits 720 for output (e.g., to two different output modules) depending on address information in each of the packets.

In one embodiment, each switch control module 530 illustratively connects to each of the twelve media control modules 520 via separate respective gigabit Ethernet communication links. Each switch control module 530 also has four additional gigabit Ethernet physical layer circuits 720 for connecting, via external gigabit Ethernet communication links 710, external devices. Such external connections enable the switch control modules 530 to communicate switched packets to and from such external devices. The packets communicated by these additional four physical layer circuits 720 are also switched by the switch device 730 in each switch control module 530. Therefore, packets can originate from such external devices and be outputted to other external devices or a media control module 520. In addition or alternatively, packets originating from a media control module 520 can be outputted to one of these external devices (or another media control module).

In the case that an external device serves as a source 50 of injectable data, the data throttling technique described above may be used. In such a case, the data source 50 opens a TCP connection with a specific active output module 521-2 possessing the output port (output of the data link control circuit 112 of a specific adaptor 110) from which the data is to be transmitted. Packets supplied by the data source 50 are TCP/IP packets. Such TCP/IP packets are transmitted from the external data source 50 to the switch modules 531 and 532 via the appropriate external Ethernet communication links and the respective Ethernet physical layer circuits 720 of the switch control modules 531 and 532. Only the active switch module 531 or 532 activates its Ethernet physical layer circuit connected to external devices. The inactive switch module 532 or 531 disables receipt of packet data from external sources. The active switch control module 531 or 532 switches the TCP/IP packets to a specific Ethernet physical layer circuit 720 connected via an appropriate Ethernet communication link to the intended output module 521-2 possessing the desired output port. The output module 521-2 receives the injectable data (from only the active one of the switch control modules 531 or 532) and periodically transmits acknowledgment packets via the same Ethernet communications links to the switch modules 531 and 532. The switch modules 531 and 532 switch the acknowledgment packets to the Ethernet physical layer circuit 720 connected to the external source 50 from which the TCP/IP packets originated. The inactive Switch control module 532 or 531 does not transmit such packets because its external Ethernet physical layer circuits 720 are disabled. As such, the data source 50 receives acknowledgement packets via only the active switch control module 531 or 532.

Each switch control module 530 has a processor 740, (volatile and non-volatile) memory 750, additional communication interfaces 760 (e.g., 100 BASE-T Ethernet, 10 BASE-T Ethernet, RS-232) a clock circuit 770 and a time base distribution circuit 780. The specific interconnection of these elements 740–780 is not described herein in detail and can be any conventionally known connection, e.g., according to any well-known computer system, which enables the operation described below. To increase reliability and robustness, the software illustratively is stored in, and loaded from, a flash memory 740. Of the additional communication interfaces 760, two interfaces may be Ethernet interfaces dedicated to communication between the switch control modules 531 and 532 for exchanging command, control information for facilitating the redundancy. An additional (Ethernet) interface 760 may be provided to each switch control module 530 for communication of control information from an external control terminal (i.e., an operation, administration, management and provisioning terminal).

Redundant Remultiplexer Configuration

Referring again to FIG. 7, as noted above, the redundant remultiplexer illustratively has n primary media control modules 521-1, 521-2, . . . , **521-*n* and n backup media control modules 522-1, 522-2, . . . , 522-*n*, where n illustratively is 6. Illustratively, one backup module 522-1, 522-2, . . . , 522-*n* or 532 is provided for each primary module 521-1, 521-2, . . . , 521-*n* or 531** which can assume the role of the primary module in the event of failure. Herein, a failure is any event that causes a device to stop working correctly, including a malfunction of a component, a removal of a component or a user/software instructed disabling of a component (which may be done for testing purposes, to cause seamless transition to the backup module so that the primary module can be removed or serviced, or for some other reason).

Illustratively, each media control module 520 is judiciously assigned a primary role or a backup role to a specific primary module at the time of initialization or start-up or by the user at the user's discretion. That is, the module 522-1 is assigned as a backup module for the module 521-1, the module 522-2 is assigned as a backup for the module 521-2, . . . , the module **522-*n* is assigned as the backup module for the module 521-*n*. This preliminary assignment of backup roles illustratively achieved in software, thereby permitting simple reconfiguration by signals. Preliminary assignment simplifies the architecture design, since a backup module is in fact "running," i.e., processing incoming or outgoing packets, even when in "standby mode" i.e., not actively operating in replacement of its primary module. In theory, it may be possible to assign a backup module for backing up more than one primary module although this will impose a heavier processing burden on such a backup module when in the standby mode. Thus, each of the modules 522-1, 522-2, . . . , 522-*n* are assigned as a backup for only one specific other module, namely, media control modules 521-1, 521-2, . . . , 521-*n*, respectively. To that end, each backup media control module 522-1, 522-2, . . . , 522-*n* is connected to the same external devices as its respective primary media control module 521-1, 522-1, . . . , 522-*n* that it backs up. For example, if the primary media control module 521-3 is an input module, with three adaptor 110 inputs connected to three specific external signal sources (e.g., via DVB ASI communication links) then the backup media control module 522-3 which backs it up also has three adaptor 110 inputs connected to the same external signal sources, respectively. A switch may be needed for dynamically connecting the output of one external device to the media control modules 521-3 and 522-3**, whichever is currently active.

Initially, the switch control modules 531 and 532 are booted with their software. The software running on the switch control modules is capable of negotiating the primary and standby status for themselves, i.e., the initially active, switch control module 531 and to cause the other of the two to function as the backup switch control module 532 which initially operates in the standby mode. The switch control modules 531 and 532 exchange a variety of signals, information and commands, with each other for purposes of monitoring the operability of each other. These signals can be communicated in virtually any manner such as by private dedicated 10 BASE-T Ethernet (via suitable interfaces 760 of FIG. 9 and dedicated signal conductors of the backplane 510). Among other things, each switch control module 530 transmits a signal SCM_ACTIVE# to the other switch control module, as well as all of the media control modules 520. Each media control module receives the SCM_ACTIVE# signal of the switch control module 531 as the signal SCM1_ACT# and the SCM_ACTIVE# signal of the switch control module 532 as the signal SCM2_ACT#. Based on these signals, the media control modules 520 adjust the control of the selector switches 620 of their Ethernet Interfaces to receive packets from only the active switch control module 531 or 532. As noted above, each media control module 520 transmits packets to both switch control modules 531 and 532 at all times, regardless of which is active and which is in standby mode. As a result, each switch control module 531 and 532 can actually be operating, i.e., actively switching packets received from active input modules (recall, the output of inactive media control modules 520, most notably, backup modules 522-1 to **522-*n* in the standby mode, are logically disabled) to the Ethernet communication links 710 of the output modules (both active and inactive). This allows the backup switch module to keep its forwarding table up-to-date and results in faster switching in case of failure of the primary module. However, the output modules 520 will not receive the packets transmitted from the switch module operating in the standby mode. Nevertheless, recovery in the event of switch module failure can be achieved very quickly by changing the signals SCM_ACTIVE# outputted from each of the switch control modules 531 and 532. As may be appreciated, these signals received as SCM1_ACT# and SCM2_ACT# can very quickly switch the selector switch 620 to cause the MAC circuit 610 to receive packets from one physical layer circuit, e.g., the physical layer circuit 640, as opposed to the other physical layer circuit, e.g., the physical layer circuit 630**.

Redundant Operation in the Event of Failure

To illustrate the robust, redundant operation of the remultiplexer 500, several examples are now considered.

Consider a situation where TS1 is received at primary input module 521-1 and a duplicate copy TS1' is received at backup input module 522-1 for the primary media control module 521-1. Primary input module 521-1 captures certain packets and forwards them via its Ethernet interface 600 to both switches 531 and 532. Switch 531 operates as the primary switch module and switch 532 operates as the backup switch module. Backup input module 522-1 performs similar operations as the primary input module 521-1 but its output is logically disabled and therefore outputs no packets. Illustratively, the switch module 531 receives injected data packets D1 from a first external device 50 and outputs extracted data packets D2 to a second external device 60. The same data packets D1', from the first external device 50, are received at the switch module 532 and the switch module 532 has an external Ethernet communication link connected to the second external device 60. For example, it is possible that both of the switch modules 531 and 532 have their external Ethernet interfaces connected to the same network. However, the switch module 532 logically disables the bi-directional packet forwarding at its Ethernet interfaces connected to external devices 50 and 60 while in the backup mode and therefore neither receives data from the first external device 50 nor transmits data to the second external device 60.

Nevertheless, both of switch modules 531 and 532 perform the same switching on packets received from the input modules, or transmitted to the output modules. In other words, each of the switch modules 531 and 532 transmit selected packets received from the primary input module 521-1 to a primary output module 521-2 and a backup output module 522-2. Primary output module 521-2 receives only the packets from the primary switch module 531, remultiplexes certain ones of the packets and outputs the remultiplexed packets in TS2. Backup output module 522-2 performs similar operations as the primary output module, i.e., receives only the packets from the primary switch module 531 and remultiplexes certain ones of the packets. Each of the primary output module 521-2 and backup output module 522-2 are connected by communication links (e.g., DVB ASI compliant links) to the same external device. A switch may be provided for selecting packets outputted on whichever link leads to the currently active one of the primary output module 521-2 and backup output module 522-2. Illustratively, each of the primary and backup output modules 521-2 and 522-2 can output on interfaces 140 (such as an RS-422 interface not shown) signals indicating whichever of the modules 521-2 and 522-2 is currently active.

As noted above, best effort data that is MPE decapsulated from an externally supplied TS is transmitted from an input module 521-1 or 522-1 to the switch control modules 531 and 532 and to the output modules 521-2 and 522-2 as IP data. Program data of TS packets are encapsulated as RTP/UDP/IP packets for transmission to the switch control modules 531 and 532 and to the output modules 521-2 and 522-2. The switch control modules 531 and 532 can switch such packets based on: (1) the IP destination address of the packet; or (2) the MAC destination address of the packet, whichever is appropriate for the final destination of the packet. For example, the switch control modules 531 and 532 preferably do not participate in a TCP connection between an external source 50 and an output module 521-2 and 522-2 and therefore, it may be faster and more efficient for the switch control modules 531 and 532 to simply switch such TCP/IP packets based on their IP destination addresses.

Illustratively, the destination IP address in RTP/IP and UDP/IP packets is a multicast address to which both output modules 521-2 and 522-2 subscribe to receive the same packets. In addition, the primary output module 521-2 and its respective backup output module 522-2 share one common IP address and can both receive unicast packets destined to this shared IP address. (Each of the primary output module 521-2 and the backup output module 522-2 has its own individual IP address not monitored by the others for control purposes.) This enables both output modules to receive the same RTP/UDP/IP packets.

In one embodiment, a primary output module 521-2 and its respective backup 522-2 can be assigned the same MAC address. Alternatively, both the primary output module 521-2 and its corresponding backup output module 522-2 can monitor the MAC address assigned to each other.

Also, each of the primary and backup output modules 521-2 and 522-2 illustratively receives and processes packets destined to the same UDP port numbers (except, as noted above, the backup output module 522-2 does not output any TS packets externally while in standby mode). In the case of TCP/IP packets, the output modules 522-2 perform more selective processing. Specifically, while active, the primary output module 521-2 receives and processes TCP/IP packets destined to the shared IP address. Meanwhile, the backup output module 522-2, while operating in standby mode, discards or ignores all TCP/IP packets addressed to the shared IP address. The backup output module also discards or ignores all received broadcast ARP request packets that originate from or are destined to the shared IP address. When the backup output module switches from standby mode to active, it functions in the same manner as described above for the primary output module 521-2 while active. (Likewise, the primary output module switches to standby mode and operates the same way as described above for the backup output modules in standby mode.)

EXAMPLE 1

Failure of Primary Input Control Module

Suppose that primary input module 521-1 fails, i.e., malfunctions, is physically removed or is commanded by control signal or command to deactivate. The failure of the primary output module 521-1 illustratively is detected by the switch control modules 531 and 532. In response, the active switch control module 531 instructs the backup input module 522-1 to immediately become active. In response, the backup input module 522-1 enables its output, i.e., its outputting of packets from its Ethernet interface 600.

Note that the processor 160 of the backup input module 522-1 merely activates the output of packets from its Ethernet interface 600. That is, while in the standby mode, the backup input module 522-1 is performing all of the same operations as the primary input module 521-1 (or, all of the operations that the primary input module 521-1 is supposed to be performing) except the outputting of packets. This is significant because it enables a quick substitution of the backup input module 522-1 for the failed primary input module 521-1 with minimal loss of packet data. Consider that there is a delay between receipt of each packet from an external device at the input modules 521-1 and 522-1 and transfer of such packets to the switch control modules 531 and 532. Furthermore, the input modules 521-1 and 522-1 are required to process such packets, prior to outputting them to the switch control modules 531 and 532. Most notably, an input module:

(a) filters out those packets to be retained and those to be discarded, (b) remaps packet identifiers (PIDs) as necessary, (c) possibly scrambles or descrambles packet data, (d) generates a time stamp indicating the time of receipt of each incoming packet to be retained (and later outputted to the switch control modules 531 and 532) so that the incoming packet can inevitably be transmitted from (an output module 521-2 or 522-2 of) the remultiplexer 500 at the correct time alignment, (e) receives packets from several external sources and orders them for output to the switch control modules 531 and 532, (f) identifies the constituent elementary streams (the video elementary stream(s), the audio elementary stream(s), the closed caption text elementary stream(s), the private data stream(s), and the entitlement control message stream(s)) of each program, and (g) re-packages the incoming packets for transfer within the remultiplexer, e.g., encapsulates each received transport packet in an RTP/UDP/IP packet for internal routing and transfer or decapsulates TS/MPE best effort packets to form IP packets.

To perform these tasks, incoming packets received from an external device must be buffered for some time and already processed packets must be enqueued and ready for transfer to the switch control modules 531 and 532. If the backup input module 522-1 had not already been performing all of these tasks (for example, because the backup input module 522-1 had its external input(s) disabled or was completely disabled) then the latency between activating the backup input module 522-1 and restoration of the supply of input module processed packets to the switch control modules 531 and 532 would be far greater. In short, the technique proposed herein, where the backup input module 522-1 switches from standby to active mode by simply enabling the output of packets already processed in parallel to the primary input module 521-1, enables quick restoration of packet supply to the switch control modules 531 and 532 and far fewer lost packets.

EXAMPLE #2

Failure of a Primary Output Control Module

Suppose now that the primary output control module 521-2 fails. The failure is detected by both of the switch control modules 531 and 532. The active switch control module, e.g., the primary switch control module 531, issues a control instruction to the backup output module 522-2 to cause it to become active. While in standby mode, i.e., before switching to active mode, the backup output module 522-2 has been performing the same processing as the primary output module 521-2 and on an identical copy of the (RTP/UDP/IP and UDP/IP) packets, and outputting these packets simultaneously with the primary blade. If a failure occurs, then the switch control module signals to the backup module 522-2 that it is now the primary, and the backup output module 522-2 transmits an external signal to a switch device near the second external device 60 to cause the second external device 60 to cease attempting to receive packets from the external communication link connected to the external output of the primary output module 521-2 and instead begin receiving packets from the external communication link connected to the output of the backup output module 522-2.

Again, note that while in the standby mode, the backup output module 522-2 is performing all of the same operations as the primary output module 521-2 (or, all of the operations that the primary output module 521-2 is supposed to be performing) except the outputting of Ethernet packets (and the receipt of TCP/IP packets). This is significant because it enables a quick substitution of the backup output module 522-2 for the failed primary output module 521-2 with minimal loss of packet data. Consider that there is a delay between receipt of each packet from the active switch control module 531 or 532 and output to an external device. In addition, the output modules 521-2 and 522-2 are required to process such packets, prior to outputting them to the external devices. Most notably, an output module 521-2 or 522-2:

(a) filters out those packets to be retained and those to be discarded, (b) remaps packet identifiers (PIDs) as necessary, (c) possibly scrambles or descrambles packet data, (d) receives packets from several sources and orders them for output to the switch control modules 531 and 532, (e) if necessary, recovers a time base for each program carried in the packets to assign them time stamps that can be used for timing the output of the packets, (f) re-packages the incoming packets for transfer within the remultiplexer, e.g., performs MPE, segmentation and TS encapsulation for best-effort data or extracts transport packets from received RTP/IP packets, (g) corrects PCRs in the packets according to any change in output timing introduced by re-ordering the packets for output, and (h) compares dispatch time stamps assigned to each packet to the time stamps generated by a mechanism to access a centralized single time base clock at the switch module on the respective output adaptor 110 to synchronize the transmission of the respective packet at approximately the correct time in the externally outputted transport stream. Resources for transmitted packets, namely, descriptors and packet storage spaces are then deallocated. The backup output module 522-2 also maintains substantially the same time as the primary output module 521-2 because they have access to the centralized clock on the active switch control module. Therefore, the backup output module 522-2 can begin outputting packets at, or nearly at, the packet in sequence where the primary output module 521-2 failed.

To perform these tasks, incoming packets received from the active switch control module 531 or 532 must be buffered for some time and already processed packets must be enqueued and ready for output to the external device. If the backup output module 522-2 had not already been performing all of these tasks (for example, because the backup input module 522-2 had its Ethernet interface 600 disabled or was completely disabled) then the latency between activating the backup output module 522-2 and restoration of the external output of output module processed packets to the second external device 60 would be far greater. In short, the technique proposed herein, wherein the backup output module 522-2 switches from standby to active mode by simply signaling and external device while processing the packets in parallel with the primary output module, enables quick restoration of output of packets supply to the external device and far fewer lost packets.

There is one exception to the above, namely, the backup output module 522-2 does not receive or process TCP/IP packets. These are packets provided from the first source 50 using the data throttling feature. However, TCP/IP is a connection oriented protocol wherein the primary output module 521-2 only sends acknowledgement packets after the data contained therein are successfully transmitted from the primary output module 521-2. Thus, in the case of failure of the primary output module 521-2, some data provided from the data source 50 will have been provided to the primary output module 521-2 but will be buffered pending output. Since no acknowledgement packets are sent back to the data source 50 when the primary output module 521-2 fails, the data source will attempt to re-establish the TCP connection using the shared IP address. By this time, the backup output module 522-2 will have switched to the active mode and will process TCP/IP packets. Thus, the data source 50 opens the new TCP/IP connection with the backup output module 522-2 and can resume packet supply with those TCP/IP packets following the last TCP/IP packets previously acknowledged by the (now failed) primary output module 521-2.

EXAMPLE #3

Failure of a Switch Control Module

In this example, the primary switch control module 531 fails. The failure is detected by the backup switch control module 532. In response, the backup switch control module 532 begins outputting the signal SCM_ACTIVE#, which is received as SCM2_ACT# by all media control modules 520, indicating that it is now the active switch control module. If needed, the primary switch control module 532 can instruct the backup switch control module 531 to transmit the signal SCM_ACTIVE# (received as SCM1_ACT# by all media control modules 520) indicating that it is no longer active. In response, each of the media control modules 520, most notably, the output modules 521-2 and 522-2 cause their selector switches 620 in their Ethernet interfaces 600 to select the packets transmitted form the switch control module 532 rather than the packets form the switch control module 531. Otherwise, the output modules 521-2 and 522-2 continue to process in the same fashion. The transition of switch control modules 531 and 532 is basically transparent to the various communications and connections to and from the input and output modules 521-1, 521-2, 522-1 and 522-2.

The switch control module 532 also now activates its Ethernet interfaces 720 connected to the external devices 50 and 60. Thus, the copy of data D1' is now received from the first external device 50 and is switched through the switch control module 532. Likewise, the switch control module 532 switches a copy of received data D2' for output to the second external device 60. In complimentary fashion, the switch control module 531 disables its Ethernet interfaces 720 connected to the external devices 50 and 60 while it is in backup status. Thus, the switch control module 531 does not receive the copy of the data D1 from the first external device 50 and does not produce the copy of the data D2 for supply to the second external device 60.

The above discussion is intended to be merely illustrative of the invention. Those having ordinary skill in the art may devise numerous alternative embodiments without departing from the spirit and scope of the following claims.

The invention claimed is:

1. A redundant remultiplexer comprising:

(a) at least two media control modules, each having multiple ports capable of being configured to operate as inputs or outputs, and having:

i) at least one port capable of receiving an externally originating sequence of one or more packets, or transmitting externally a sequence of one or more packets, ii) a clock capable of generating a time value that can be used to determine a time at which each externally originating packet is received at the port, or an approximate time for transmitting externally each packet from the port, iii) at least one processor capable of processing each packet according to the respective time value determined for the packet by the clock, to schedule selected ones of the packets for transmission, and iv) an interface for transmitting packets processed by the at least one processor to, or receiving packets to be processed by a processor from, another device, and (b) at least one switch control module, each capable of communicating packets with the media control modules via the interfaces of the media control modules, and each capable of selecting, based on address information carried within each packet present at the switch control module, a specific media control module to receive each of the packets present at the switch control module, wherein one of the media control modules operates as a primary module either in an input mode, for receiving an externally originating sequence of packets, or in an output mode, for outputting externally a sequence of packets, and wherein another one of the media control modules operates as a backup module for the primary module, wherein, if the primary module operates in an input mode, the at least one processor of the backup module performs the same processing of packets as the primary module but the interface of the backup module only transmits processed packets to each switch control module if the primary module fails, and wherein, if the primary module is operating in the output mode, the at least one processor of the backup module performs the same processing as the primary output module on the same sequence of packets received from the switch module, but the port of the backup module only externally outputs the signal if the primary module fails.

2. The remultiplexer of claim 1 wherein the interface of each said media control module is connected to a full-duplex Ethernet link, which incurs an unpredictable jitter delay for communicating each packet thereon.

3. The remultiplexer of claim 1 wherein each of said at least one switch control module is capable of transmitting each of one or more of the to-be-externally outputted packets to each of one or more of the media control modules with a multicast destination address of a specific multicast group to which the one or more media control modules subscribe, wherein if the primary module operates in the output mode, the backup module is capable of subscribing to the same multicast group as the primary module so that both the primary module and the backup module receive and process the multicast packets transmitted by the switch control module.

4. The remultiplexer of claim 1 wherein each of said at least one switch control module is capable of transmitting at least one IP packet to the primary module using a MAC address assigned to at least the primary module and wherein the backup module is capable of receiving and processing an identical copy of the at least one of the IP packets transmitted to the primary module with the MAC address assigned to at least the primary output module.

5. The remultiplexer of claim 1 wherein the backup module and primary module are both capable of being assigned the same common address, wherein each of the primary module and backup module is capable of receiving, for external output from its port within the sequence of packets, externally originating data, the externally originating data being received via a TCP connection with an external source, and wherein the backup module is capable of filtering out certain control packets received at its interface prior to processing by the IP protocol stack, if no failure of the primary module is detected.

6. The remultiplexer of claim 5 wherein the backup module filters out TCP packets destined for the common address.

7. The remultiplexer of claim 6 wherein the backup module filters out ARP request packets sourced from the common address or destined to said common address.

8. The remultiplexer of claim 1, wherein said remultiplexer is a primary switch module, the remultiplexer further comprising:

(c) a backup switch module capable of communicating the same packets as the primary switch module, with the media control modules via the interfaces of the media control modules, and capable of selecting, based on address information carried within each corresponding packet, a specific media control module to receive each of selected received packets, as the primary switch module, wherein the media control modules discard packets transmitted from the backup switch module unless the primary switch module is determined to have failed.

9. The remultiplexer of claim 1, wherein the interface of each media control module comprises:

(c) a media access control circuit, (d) physical layer circuitry having i) a first receive input capable of receiving packets from the primary switch module, ii) a first receive output for outputting the packets, destined to a device, that are received via the first receive input, iii) a second receive input capable of receiving packets from a backup switch module for the first switch module, and iv) a second receive output for outputting the packets, destined to a device, that are received via the second receive input, and (e) a switch circuit having i) first and second selectable inputs connected to the first and second receive outputs of the physical layer circuitry, respectively, and ii) an output connected to the receive input of the media access control circuit, so that the media access control circuit is capable of selectively receiving the to-be-externally transmitted packets from only one of the primary switch module and backup switch module at one time, the switch selecting the packets received from the backup switch module only in response to detecting a failure of the primary switch module.

10. The redundant remultiplexer of claim 9 wherein each of the primary switch module and the backup switch module comprises:

(f) at least one external interface for receiving packets other than those provided by the media control modules, the external interface being capable of receiving one or more addressed packets, i) each of the primary and backup switch modules being capable of receiving identical copies of the addressed packets and being capable of selecting, based on address information carried with the corresponding packet, the same specific media control module to receive each of selected ones of the addressed packets, ii) wherein the same IP address is assigned to the external interfaces of both of the primary switch module and the backup switch module and wherein the backup switch module is capable of disabling its external interface in the absence of a determination that the primary switch module has failed.

11. The remultiplexer of claim 1 wherein, prior to a failure, the backup module is capable of processing each packet according to the respective time value determined for the packet by the clock, to schedule selected ones of the packets for transmission.

12. The remultiplexer of claim 1 wherein the backup module is capable of processing selected ones of the packets prior to a failure that incur mutually different delays between the time the respective selected packet is received and the time it is transmitted from the backup module.

13. The remultiplexer of claim 1 wherein the backup module is capable of selecting fewer than all of the received packets for output from the backup module prior to a failure.

14. The remultiplexer of claim 1 wherein the backup module is capable of receiving packets at a higher packet rate than a packet rate at which the selected ones of the packets are transmitted from the backup module prior to a failure.

15. The remultiplexer of claim 1 wherein there is a delay between initiating processing of packets by the backup module and scheduling the selected packets for output from the backup module prior to a failure, wherein the packets selected for output from the primary module form a sequence of information suitable for maintaining a bit rate and synchronized operation of a device which receives the packets, and wherein the packets are outputted from the backup module to substantially maintain at least one of the bit rate and the synchronized operation of the device that receives the packets.

16. A media control module comprising:

(a) at least one port capable of receiving an externally originating sequence of one or more packets, or transmitting externally a sequence of one or more packets, (b) a clock capable of generating a time value that can be used to determine a time at which each externally originating packet is received at the port, or an approximate time for transmitting externally each packet from the port, (c) at least one processor capable of processing each packet according to the respective time determined for the packet by the clock, to schedule selected ones of the packets for transmission, and (d) an interface including a media access control circuit, a selector and two physical layer circuits, each physical layer circuit having a transmit input commonly connected to a transmit output of the media access control circuit, so that each physical layer circuit is capable of outputting a mirror image copy of externally received packets to each of a primary switch module and a backup switch module, each physical layer circuit having a receive output connected to respective first and second selectable inputs of the selector, the selector having a switchable output connected to the receive input of the media access control circuit, so that the media access control circuit is capable of selectively receiving the to-be-externally transmitted packets from only an active one of the primary and backup switch modules, wherein the primary and backup switch modules are capable of running concurrently, with one of the concurrently running primary and backup switch modules being deemed active and the other of the concurrently running primary and backup switch modules being deemed inactive, and wherein each physical layer circuit is capable of receiving duplicate sets of addressed packets from, respectively, the primary switch module and the backup switch module, but the selector permits only one set to be received at the media access control circuit from whichever of the primary switch module and the backup switch module is currently deemed active.

17. A redundant remultiplexer comprising:

(a) a primary module for processing received packets in order to output selected ones of the received packets from the remultiplexer at a particular time relative to other selected packets, at least some of the outputted packets containing information to be received according to a specific time schedule at a receiver relative to other related outputted ones of the packets, the primary module having an output for transmitting ones of the received packets, (b) a backup module for processing copies of at least some of the same packets received at the primary module in order to output selected ones of the received packets from the remultiplexer at a particular time relative to other selected packets, the backup module having an output which is disabled except upon determining that the primary module has failed, and (c) a switch module connected to the primary and backup module for switching packets received from outputs of the primary and backup modules to inputs of active primary and backup output modules, wherein, in response to detecting a failure of the primary module, the backup module activates its output to transmit copies of the ones of the received packets otherwise to be transmitted by the primary module and which have already been processed by the backup module prior to detecting the failure, so as to reduce a number of packets omitted from the remultiplexer output carrying information to be delivered according to the strict time schedule.

18. The remultiplexer of claim 17 wherein the primary module is a primary input module comprising an external input for receiving externally supplied packets and an output for outputting the selected ones of the packets to the switch module, and the backup module is a backup input module comprising an external input for receiving an identical copy of the externally supplied packets, wherein each of the primary and backup input modules comprises a mechanism to access a centralized single time base clock at the switch module for generating a receipt time of each selected packet to be outputted, and wherein the receipt time generated for a specific selected packet is used to determine a correct time at which to output the selected packet from the remultiplexer.

19. The remultiplexer of claim 17 wherein the primary module is a primary output module comprising an input for receiving the selected packets from the switch module and an external output for outputting the selected packets from the remultiplexer, and the backup module is a backup output module comprising an input for receiving an identical copy of the selected packets, wherein each of the primary and backup input modules comprises a mechanism to access a centralized single time base clock at the switch module clock for generating a dispatch time for each selected packet to be outputted, and wherein the dispatch time is used to output the selected packet externally from the remultiplexer according to the schedule.

20. The remultiplexer of claim 17 wherein, prior to a failure, the backup module is capable of processing each packet according to the respective time value determined for the packet by the clock, to schedule selected ones of the packets for transmission.

21. The remultiplexer of claim 17 wherein the backup module is capable of processing selected ones of the packets prior to a failure that incur mutually different delays between the time the respective selected packet is received and the time it is transmitted from the backup module.

22. The remultiplexer of claim 17 wherein the backup module is capable of selecting fewer than all of the received packets for output from the backup module prior to a failure.

23. The remultiplexer of claim 17 wherein the backup module is capable of receiving packets at a higher packet rate than a packet rate at which the selected ones of the packets are transmitted from the backup module prior to a failure.

24. The remultiplexer of claim 17 wherein there is a delay between initiating processing of packets by the backup module and scheduling the selected packets for output from the backup module prior to a failure, wherein the packets selected for output from the primary module form a sequence of information suitable for maintaining a bit rate and synchronized operation of a device which receives the packets, and wherein the packets are outputted from the backup module to substantially maintain at least one of the bit rate and the synchronized operation of the device that receives the packets.

* * * * *